(12) United States Patent
Lu et al.

(10) Patent No.: US 12,336,020 B2
(45) Date of Patent: Jun. 17, 2025

(54) RANDOM ACCESS METHOD AND APPARATUS AND COMMUNICATION SYSTEM

(71) Applicant: FUJITSU LIMITED, Kawasaki (JP)

(72) Inventors: Yang Lu, Beijing (CN); Jian Zhang, Beijing (CN); Qinyan Jiang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 497 days.

(21) Appl. No.: 17/885,705

(22) Filed: Aug. 11, 2022

(65) Prior Publication Data

US 2022/0394781 A1 Dec. 8, 2022

Related U.S. Application Data

(63) Continuation of application No. PCT/CN2020/075125, filed on Feb. 13, 2020.

(51) Int. Cl.
*H04L 12/00* (2006.01)
*H04W 74/04* (2009.01)
(Continued)

(52) U.S. Cl.
CPC ....... *H04W 74/0841* (2013.01); *H04W 74/04* (2013.01); *H04W 74/0866* (2013.01)

(58) Field of Classification Search
CPC ............. H04W 74/0841; H04W 74/04; H04W 74/0866; H04W 74/0838; H04W 74/0836;
(Continued)

(56) References Cited

U.S. PATENT DOCUMENTS 9,253,692 B1* 2/2016 Shah ................. H04W 36/0072
11,343,855 B2* 5/2022 Wu ........................ H04L 5/0048
(Continued)

FOREIGN PATENT DOCUMENTS

CN 107734601 A 2/2018
CN 107734690 A 2/2018
(Continued)

OTHER PUBLICATIONS

Wu et al., CN109699087A, Method, equipment and the terminal of random access, 2019, 15 pages (Year: 2019).*
(Continued)

*Primary Examiner* — Frantz Coby
(74) *Attorney, Agent, or Firm* — Myers Wolin, LLC

(57) ABSTRACT

A random access method and apparatus and a communication system. The apparatus includes a first processor circuit, the first processor circuit being configured to: receive resource configuration of contention-free random access, the resource configuration of contention-free random access comprising resource configuration of second type contention-free random access (CFRA); and perform a second type contention-free random access procedure according to the resource configuration of the second type CFRA, wherein the resource configuration of the second type CFRA comprises a second type CFRA preamble index associated with a synchronization signal block (SSB) or a channel state information reference signal (CSI-RS), configuration of a physical random access channel occasion (RO) of a second message (MsgA), and configuration of a physical uplink shared channel (PUSCH) of the MsgA.

14 Claims, 14 Drawing Sheets

(51) Int. Cl.
  *H04W 74/08* (2009.01)
  *H04W 74/0833* (2024.01)
(58) Field of Classification Search
  CPC .. H04W 48/16; H04W 74/0833; H04L 5/0053
  USPC .......................................................... 370/329
  See application file for complete search history.

(56) References Cited

U.S. PATENT DOCUMENTS

| | | | | |
|---|---|---|---|---|
| 11,672,017 | B2* | 6/2023 | Agiwal | H04W 74/0833 370/329 |
| 2019/0174551 | A1 | 6/2019 | Liu et al. | |
| 2019/0261411 | A1* | 8/2019 | Chin | H04W 74/0833 |
| 2019/0357063 | A1 | 11/2019 | Lee et al. | |
| 2020/0252971 | A1* | 8/2020 | Wu | H04W 74/006 |
| 2021/0014889 | A1* | 1/2021 | Liu | H04W 56/001 |
| 2021/0251013 | A1* | 8/2021 | Turtinen | H04W 74/0833 |
| 2023/0292376 | A1* | 9/2023 | Agiwal | H04L 5/0048 |

FOREIGN PATENT DOCUMENTS

| | | | |
|---|---|---|---|
| CN | 109699087 A | 4/2019 | |
| CN | 110351877 A | 10/2019 | |
| EP | 3 547 566 A1 | 10/2019 | |
| WO | WO-2016117937 A1 * | 7/2016 | ............... H04L 5/00 |
| WO | WO-2021125627 A1 * | 6/2021 | .......... H04W 74/002 |

OTHER PUBLICATIONS

Notice of Reasons for Refusal issued by the Japan Patent Office for corresponding Japanese Patent Application No. 2022-548232, mailed on Oct. 3, 2023, with an English translation.
Ericsson, "CFRA in 2-step RA", Agenda Item: 6.13.4, 3GPP TSG-RAN WG2 RAN2 #108, R2-1915605, Revision of R2-1912681, Reno, Nevada, USA, Nov. 18-22, 2019.
Wi Rapporteur (ZTE), "RAN1 agreements for Rel-16 2-step RACH", Agenda Item: 7.2.1, 3GPP TSG-RAN WG1 #99, R1-1913598, Reno, Nevada, USA, Nov. 18-22, 2019.
Extended European search report with supplementary European search report and the European search opinion Issued by the European Patent Office for corresponding European Patent Application No. 20918956.2-1216, mailed on Feb. 21, 2023.
Ericsson, "Procedure for Two-step RACH", Agenda Item: 7.2.1.2, 3GPP TSG-RAN WG1 Meeting #98, R1-1910907, Chongqing, China, Oct. 14-18, 2019.
Nokia et al., "Feature lead summary#3 on 2 step RACH procedures", Agenda Item: 7.2.1.2, 3GPP TSG-RAN WG1 Meeting #97, R1-1907900, Reno, USA, May 13-17, 2019.
Vivo, "Discussion on the MsgA resource selection", Agenda Item: 11.13.5, 3GPP TSG-RAN WG2 Meeting #106, R2-1905655, Reno, USA, May 13-17, 2019.
First Notification of Office Action and Search Report issued by the China National Intellectual Property Administration for corresponding Chinese Patent Application No. 202080096050.8, mailed on Dec. 27, 2023, with an English translation.
Qualcomm Incorporated et al., "Contention-free random access for 2-step RACH", Agenda Item: 9.4.4, 3GPP TSG RAN Meeting #85, RP-192002, Newport Beach, USA, Sep. 16-20, 2019.
Samsung, "PUSCH Resource Configuration for 2 step CFRA", Agenda Item: 6.13.3, 3GPP TSG-RAN WG2 Meeting #109, R2-2000224, Athens, Greece, Feb. 24-28, 2020.
International Search Report and Written Opinion of the International Searching Authority issued by the China National Intellectual Property Administration for International Patent Application No. PCT/CN2020/075125, mailed on Nov. 3, 2020, with an English translation.
The Second Office Action and Search Report issued by the China National Intellectual Property Administration for corresponding Chinese Patent Application No. 202080096050.8, mailed on Aug. 3, 2024, with an English translation.

* cited by examiner

RANDOM ACCESS METHOD AND APPARATUS AND COMMUNICATION SYSTEM

CROSS-REFERENCE TO RELATED APPLICATION

This application is a continuation application of International Application PCT/CN2020/075125 filed on Feb. 13, 2020, and designated the U.S., the entire contents of which are incorporated herein by reference.

TECHNICAL FIELD

This disclosure relates to the field of communication technologies.

BACKGROUND

A random access procedure is a very critical step in mobile communication technologies.

FIG. 1A is a flowchart of an existing 4-step contention-based random access (CBRA) procedure. As shown in FIG. 1A, in operation 101, a terminal equipment selects a CBRA preamble, and transmits the preamble via Msg1 in a contention-based random access occasion (RO) pre-configured by the system; in operation 102, a network device transmits msg2 after receiving the preamble; thus, a random access response (RAR) grants a dedicated uplink PUSCH resource for the terminal equipment transmitting the preamble and allocates a temporary cell radio network temporary identifier (CRNTI) to indicate uplink advance of a physical uplink shared channel (PUSCH); in operation 103, the terminal equipment transmits Msg3 carrying signaling or data on the PUSCH resource; and in operation 104, the network device transmits contention resolution signaling Msg4 for Msg3 to the terminal equipment.

FIG. 1B is a flowchart of an existing 2-step contention-based random access (CBRA) procedure. As shown in FIG. 1B, in operation 105, a terminal equipment transmits MsgA, MsgA containing a 2-step random access preamble and a payload, and the terminal equipment transmits the preamble of MsgA in the contention RO and transmits signaling or service data of MsgA in a contention physical uplink shared channel (PUSCH) resource; and in operation 106, the network device transmits MsgB after receiving MsgA, thereby transmitting a random access response and a contention resolution message to the terminal equipment.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

It was found by the inventors that with the advancement of technologies, types of random access will continue to increase. In a case where multiple types of random access exist in communication standards, how to trigger random access with smaller transmission delay of a PUSCH has become a problem needing to be solved.

Embodiments of this disclosure provide a random access method and apparatus and a communication system, in which a terminal equipment receives configuration of second type contention-free random access (CFRA), hence, the terminal equipment may perform second type CFRA with smaller transmission delay of a PUSCH.

According to a first aspect of the embodiments of this disclosure, there is provided a random access method, applicable to a terminal equipment, the method including:

receiving resource configuration of contention-free random access, the resource configuration of contention-free random access including resource configuration of second type contention-free random access (CFRA); and performing a second type contention-free random access procedure according to the resource configuration of the second type CFRA, wherein the resource configuration of the second type CFRA includes a second type CFRA preamble index associated with a synchronization signal block (SSB) or a channel state information reference signal (CSI-RS), configuration of a physical random access channel occasion (RO) of a second message (MsgA), and configuration of a physical uplink shared channel (PUSCH) of the MsgA.

According to a second aspect of the embodiments of this disclosure, there is provided a random access method, applicable to a network device, the method including:

receiving resource configuration of contention-free random access, the resource configuration of contention-free random access including resource configuration of second type contention-free random access (CFRA); and performing a second type contention-free random access procedure according to the resource configuration of the second type CFRA, wherein the resource configuration of second type CFRA includes second type CFRA preamble index associated with a synchronization signal block (SSB) or a channel state information reference signal (CSI-RS), configuration of a physical random access channel occasion (RO) of a second message (MsgA), and configuration of a physical uplink shared channel (PUSCH) of the MsgA.

According to a third aspect of the embodiments of this disclosure, there is provided a random access apparatus, applicable to a terminal equipment, the apparatus carrying out the random access method of the embodiment of the first aspect of this disclosure.

According to a fourth aspect of the embodiments of this disclosure, there is provided a random access apparatus, applicable to a network device, the apparatus carrying out the random access method of the embodiment of the second aspect of this disclosure.

According to a fifth aspect of the embodiments of this disclosure, there is provided a terminal equipment, including the random access apparatus described in the embodiment of the third aspect of this disclosure.

According to a sixth aspect of the embodiments of this disclosure, there is provided a network device, including the random access apparatus described in the embodiment of the fourth aspect of this disclosure.

According to a seventh aspect of the embodiments of this disclosure, there is provided a communication system, including the terminal equipment described in the embodiment of the fifth aspect and the network device described in the embodiment of the sixth aspect of this disclosure.

According to an eighth aspect of the embodiments of this disclosure, there is provided a computer readable program, which, when executed in a random access apparatus or a terminal equipment, will cause the random access apparatus or the terminal equipment to carry out the random access method described in the embodiment of the first aspect of this disclosure.

According to a ninth aspect of the embodiments of this disclosure, there is provided a computer storage medium, including a computer readable program, which will cause a random access apparatus or a terminal equipment to carry out the random access method described in the embodiment of the first aspect of this disclosure.

According to a ten aspect of the embodiments of this disclosure, there is provided a computer readable program, which, when executed in a random access apparatus or a network device, will cause the random access apparatus or the network device to carry out the random access method described in the embodiment of the second aspect of this disclosure.

According to an eleventh aspect of the embodiments of this disclosure, there is provided a computer storage medium, including a computer readable program, which will cause a random access apparatus or a network device to carry out the random access method described in the embodiment of the second aspect of this disclosure.

An advantage of the embodiments of this disclosure exists in that the terminal equipment receives configuration of second type contention-free random access (CFRA), hence, the terminal equipment may perform second type CFRA with smaller transmission delay of a PUSCH.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1A:
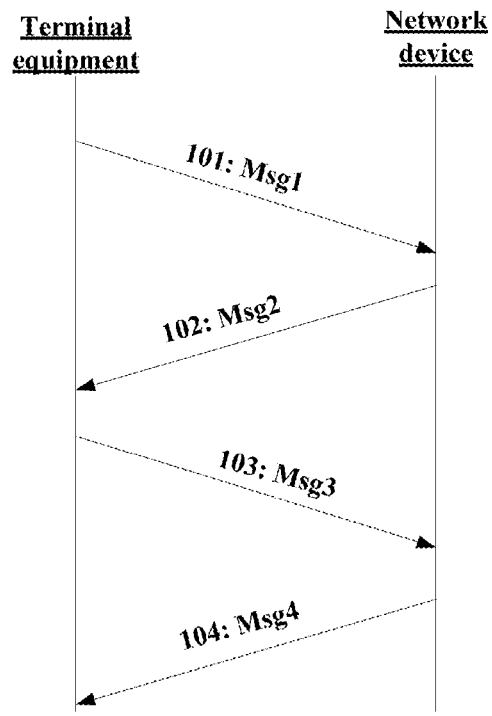
FIG. 1A is a flowchart of a 4-step contention-based random access procedure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Figure 2A:
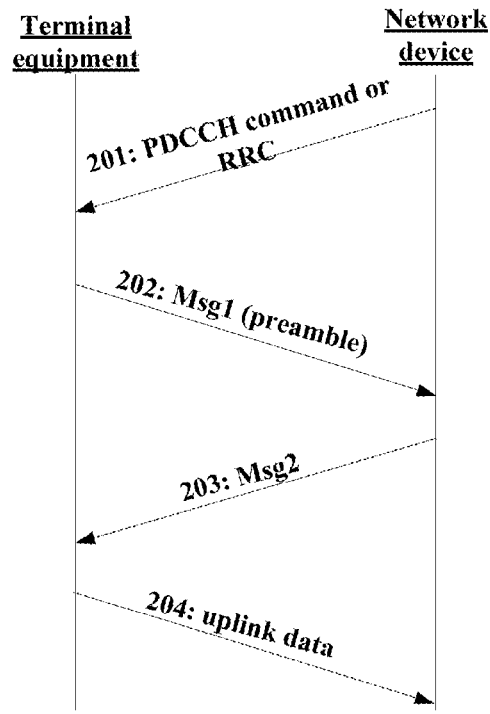
FIG. 2A is a flowchart of an Msg1-based contention-free random access procedure.

In the embodiments of this disclosure, an Msg1-based contention-free random access (CFRA) procedure and an MsgA-based contention-free random access (CFRA) procedure are involved. FIG. 2A is a flowchart of the Msg1-based contention-free random access procedure, and FIG. 2B is a flowchart of the MsgA-based contention-free random access procedure.

As shown in FIG. 2A, the contention-free random access procedure may include the following operations: operation 201: configuring dedicated preambles by a network device for a terminal equipment via a radio resource control (RRC) message or a physical downlink control channel (PDCCH) command, wherein the dedicated preambles may be configured on multiple synchronization signal blocks/channel state information (SSB/CSI) respectively; operation 202: selecting an SSB/CSI by the terminal equipment in initiating random access and transmitting the dedicated preambles via Msg1; operation 203: transmitting a random access response by the network device to the terminal equipment via Msg2 after receiving the dedicated preambles; and operation 204: transmitting uplink data or signaling by the terminal equipment in a uplink grant included in the random access response.

Figure 2B:
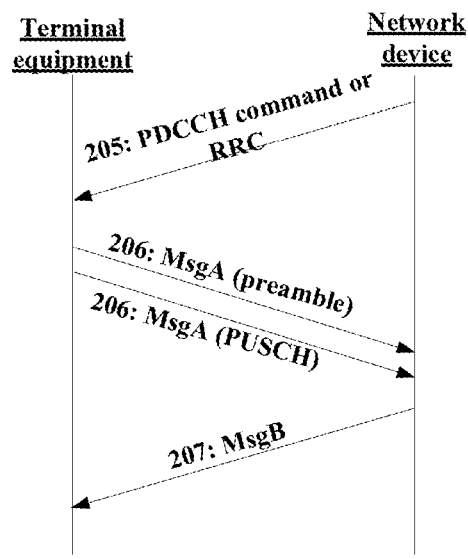
FIG. 2B is a flowchart of an MsgA-based contention-free random access procedure.

As shown in FIG. 2B, the MsgA-based contention-free random access (CFRA) procedure may include the following operations: operation 205: configuring dedicated MsgA random access preambles by the network device for the terminal equipment via a radio resource control (RRC) message or a physical downlink control channel (PDCCH) command; operation 206: selecting an SSB/CSI by the terminal equipment in initiating random access, and transmitting the dedicated preambles and physical uplink shared channels (PUSCHs) via MsgA; operation 207: transmitting a random access response by the network device to the terminal equipment via MsgB. In the MsgA-based contention-free random access procedure, the PUSCHs and the dedicated preambles are transmitted in the same operation (i.e. operation 206), thereby reducing transmission latency of the PUSCHs.

In the embodiments of this disclosure, the dedicated MsgA random access preamble may also be referred to as an MsgA-based contention-free random access preamble, and both of them have the same meaning.

A scenario of an embodiment of this disclosure shall be described below by way of an example; however, this disclosure is not limited thereto.

Figure 3:
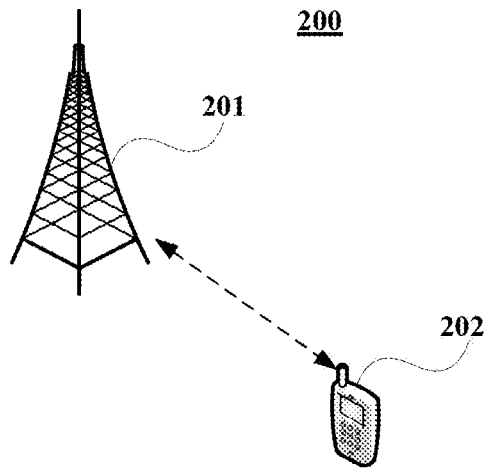
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302. For the sake of simplicity, an example having only one terminal equipment is schematically given in FIG. 3.

In the embodiment of this disclosure, existing traffics or traffics that may be implemented in the future may be performed between the network device 301 and the terminal equipment 302.

For example, such traffics may include but not limited to enhanced mobile broadband (eMBB), massive machine type communication (mMTC), and ultra-reliable and low-latency communication (URLLC), etc.

The terminal equipment 302 may transmit data to the network device 301, such as in a grant-free manner. The network device 301 may receive data transmitted by one or more terminal equipments 302, and feed back information to the terminal equipment 302 (such as acknowledgement (ACK)/non-acknowledgement (NACK) information), and the terminal equipment 302 may acknowledge to terminate a transmission process, or may perform transmission of new data, or may perform data retransmission.

Following description shall be given by taking that a network device is a receiver end or a transmitter end and a terminal equipment is a transmitter end or a receiver end in a communication system as an example. However, this disclosure is not limited thereto, and the transmitter end and/or the receiver end may also be other devices. For example, this disclosure is applicable to not only uplink grant-free transmission between a network device and a terminal equipment, but also sidelink grant-free transmission between two terminal equipments.

Figure 1B:
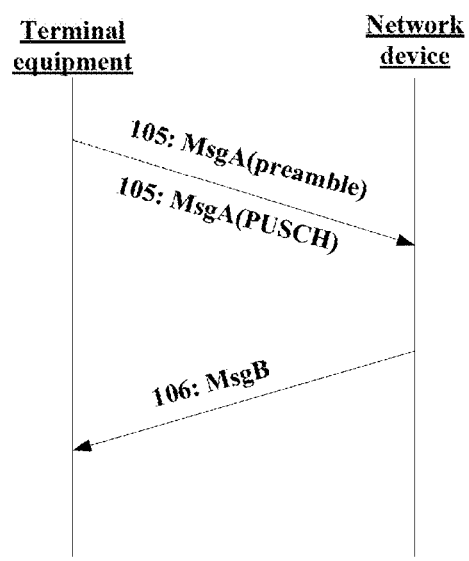
FIG. 1B is a flowchart of a 2-step contention-based random access procedure.

In the following embodiments of this disclosure, a first type of random access types includes a first type of contention-based random access (CBRA) and first type of contention-free random access (CFRA), and a second type of random access types includes second type of contention-based random access (CBRA) and second type of contention-free random access (CFRA); wherein the first type of CBRA corresponds to the 4-step contention-based random access (CBRA) procedure shown in FIG. 1A, the first type of CFRA corresponds to the contention-free random access (CFRA) procedure shown in FIG. 2A, the second type of CBRA corresponds to the 2-step contention-based random access (CBRA) procedure shown in FIG. 1B, and the second type of CFRA corresponds to the MsgA-based contention-free random access (CFRA) procedure shown in FIG. 2 (b).

In the following embodiments of this disclosure, the first type of random access resources include: a first type of contention-based random access resources and a first type of contention-free random access resources; wherein, the first type of contention-based random access resources are used for the 4-step contention-based random access procedure shown in FIG. 1A, and the first type of contention-free random access resources are used for the contention-free random access procedure shown in FIG. 2A.

In the following embodiments of this disclosure, the second type of random access resources include: a second type of contention-based random access resources and a second type of contention-free random access resources; wherein the second type of contention-based random access resources are used for the 2-step contention-based random access procedure shown in FIG. 1B, and the second type of contention-free random access resources are used for the MsgA-based contention-free random access procedure shown in FIG. 2 (b).

Embodiment of a First Aspect

The embodiment of the first aspect of this disclosure relates to a random access method, applicable to a terminal equipment, such as the terminal equipment 302.

Figure 4:
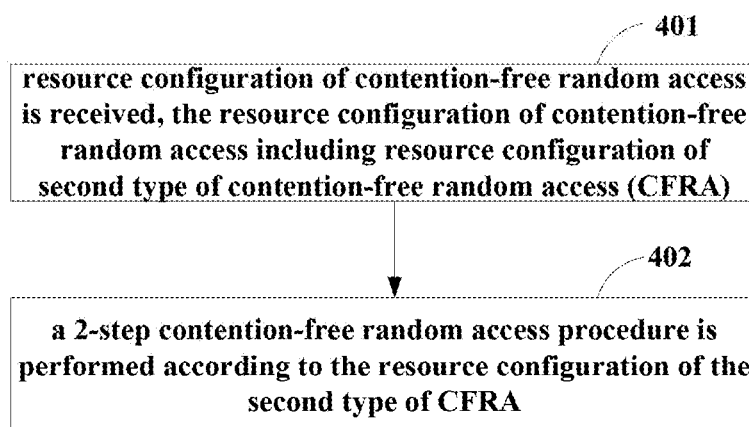
FIG. 4 is a schematic diagram of the random access method of the first aspect of the embodiments of this disclosure.

FIG. 4 is a schematic diagram of the random access method of the first aspect of the embodiments of this disclosure. As shown in FIG. 4, the random access method may include:

operation 401: resource configuration of contention-free random access is received, the resource configuration of contention-free random access including resource configuration of 2-step contention-free random access (CFRA); and operation 402: a 2-step contention-free random access procedure is performed according to the resource configuration of the 2-step CFRA.

In the first aspect of the embodiments, the configuration of 2-step CFRA includes configuration of the dedicated preamble index associated with a synchronization signal block (SSB) or channel state information reference signal (CSI-RS), configuration of at least one physical random access channel occasion (RO) of 2-step CFRA, and configuration of the PUSCH.

According to the first aspect of the embodiments, the terminal equipment receives the configuration of the 2-step contention-free random access (CFRA), hence, the terminal equipment may perform the 2-step CFRA, thereby reducing transmission latency of the PUSCH. For example, in a process of handing over the terminal equipment to a target cell, a target network device transmits a handover command to trigger the terminal equipment to perform random access; for another example, when the terminal equipment adds a secondary cell (SCell), the network device triggers the terminal equipment to perform random access to establish timing synchronization with the SCell; for a further example, when downlink data arrive at the network device, the terminal equipment is triggered to perform random access; for still another example, the terminal equipment performs random access to recover a beam after detecting a beam failure. In the above scenarios, the terminal equipment receives the configuration of the 2-step contention-free random access (CFRA), so that the 2-step CFRA may be performed. An effect of reducing latency of initial uplink data packets by the 2-step CFRA is better than the 1-step CFRA.

In at least one embodiment, the preamble index in the configuration of the 2-step CFRA may be included in dedicated radio resource control (RRC) signaling or a physical downlink control channel (PDCCH) command, and the RO configuration and PUSCH configuration may be included in RRC signaling or system information.

In at least one embodiment, the configuration of the RO may have multiple selectable forms.

RO Configuration Form 1

In RO configuration form 1, an SSB-based RO of the 2-step CFRA is shared with the 1-step contention-based random access (CBRA) and the 2-step CBRA, wherein in the shared RO, the 2-step CFRA, the 1-step CFRA and the 2-step CBRA use different preambles.

In RO configuration form 1, the configuration of the shared RO includes: a total number of random access preambles available in one RO (TotalNumberOfRA-Preambles), the number (N) of SSBs with which the RO is associated, the number (R) of preambles of the 1-step CBRA occupied by each SSB, the number (R') of preambles of the 2-step CBRA occupied by each SSB, and the number (R") of preambles of the 2-step CFRA occupied by each SSB or a total number of preambles in the RO used for the 2-step CFRA and the 2-step CBRA (msgA-TotalNumberOf_Preambles).

A parameter N represents a mapping relationship between SSBs and ROs. If N≤1, each SSB is mapped to 1/N consecutive valid ROs, for example, N=⅛, and an SSB is mapped to 8 consecutive valid ROs; and if N>1, N SSBs are mapped to a valid RO, for example, N=2, and 2 SSBs are mapped to one RO.

In RO configuration form 1, if the number (N) of SSBs with which the RO is associated is ≤1, the number (R") of preambles of the second type of CFRA occupied by each SSB is equal to a total number of preambles in an RO used for the second type of CFRA and mag A of the second type of CBRA (msgA-TotalNumberOf-Preambles) subtracted by the number (R') of preambles of the second type of CBRA occupied by each SSB; and if the number (N) of SSBs with which the RO is associated is greater than 1, the number (R") of preambles of the second type of CFRA occupied by each SSB is equal to a total number of preambles in an RO used for the second type of CFRA and the second type of CBRA (msgA-TotalNumberOf-Preambles) divided by N and then subtracted by the number (R') of preambles of the second type of CBRA occupied by each SSB.

In RO configuration form 1, in the RO, R" consecutive preambles of the second type of CFRA are located after R' consecutive preambles of the second type of CBRA.

Furthermore, in RO configuration form 1, an SSB-based RO of the second type of CFRA may also be shared with the first type of CFRA, wherein in the shared RO, the second type of CFRA and the first type of CFRA use different preambles. Moreover, the SSB-based RO of the second type of CFRA may not be shared with the first type of CFRA.

Figure 5A:
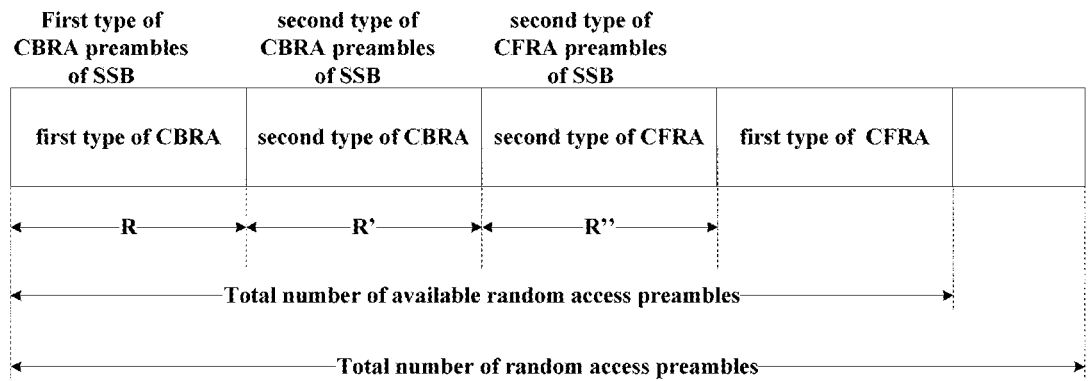
FIG. 5A is a schematic diagram of a configuration form 1 of an RO.

FIG. 5A is a schematic diagram of a configuration form 1 of an RO.

As shown in FIG. 5A, the number (N) of SSBs associated with the RO is ≤1, and a total number of preambles in one RO used for the second type of CBRA and the second type of CFRA is msgA-TotalNumberOf_Preambles, then R"=msgA-TotalNumberOf-Preambles-R'. Preambles of former R consecutive indices of each RO are used for the first type of CBRA mapped to the SSB of the RO, R' consecutive preambles after the preambles of the first type of CBRA are used for the second type of CBRA of the SSB, R" consecutive preambles after the preambles of the second type of CBRA are used for the second type of CFRA of the SSB, and TotalNumberOfRA-Preambles-R-R'-R" consecutive preambles remained in the RO may be used for the second type of CFRA.

Figure 5B:
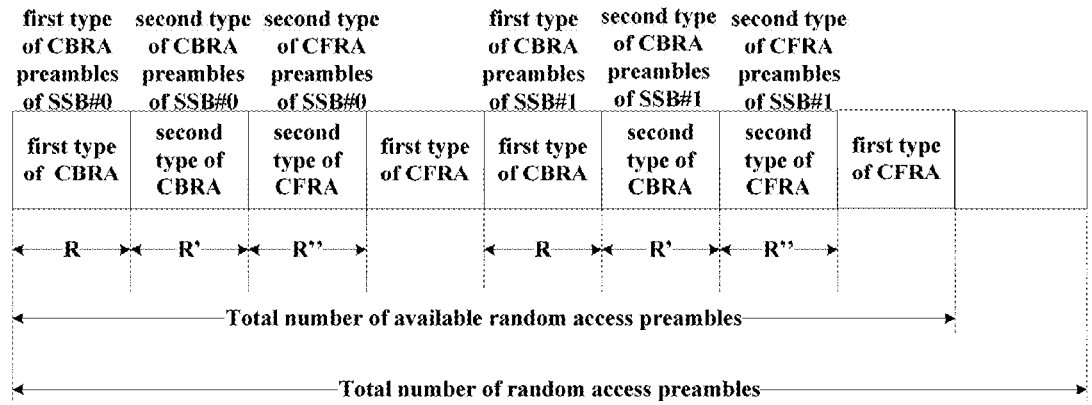
FIG. 5B is another schematic diagram of the configuration form 1 of the RO.

FIG. 5B is another schematic diagram of configuration form 1 of the RO.

As shown in FIG. 5B, the number (N) of the SSBs associated with the RO is greater than 1, for example, N=2. A total number of preambles for the second type of CBRA and the second type of CFRA in an RO is msgA-TotalNumberOf_Preambles, then R"=msgA-TotalNumberOf_Preambles/N-R'. Preambles mapped to SSB #n (0≤n<N−1) are consecutive preambles of R preambles starting from an index n*msgA-TotalNumberOf_Preambles/N and used for the first type of CBRA preambles, R' consecutive preambles after the preambles of the first type of CBRA are used for the second type of CBRA of SSB #n, R" consecutive preambles after the preambles of the second type of CBRA are used for the second type of CFRA, and TotalNumberOfRA-Preambles-preamble-msgA-TotalNumberOf_Preambles-N*R preambles remained in the RO may be used for the first type of CFRA.

RO Configuration Form 2

In RO configuration form 2, the SSB-based RO of the second type of CFRA is shared with the second type of CBRA, wherein the second type of CFRA and the second type of CBRA in the shared RO use different preambles.

In the configuration form 2 of the RO, the configuration of the shared RO includes: a total number (msgA-TotalNumberOfRA-Preambles) of random access preambles of the second type of CFRA and the second type of CBRA available on an RO, the number (N) of SSBs with which the RO is associated, and the number (R') of preambles of the second type of CBRA occupied by each SSB.

If the number (N) of SSBs with which the RO is associated is less than or equal to 1, the number (R") of preambles of the second type of CFRA occupied by each SSB is equal to a total number (msgA-TotalNumberOf-Preambles) of preambles available in an RO subtracted by the number (R') of preambles of the second type of CBRA occupied by each SSB; and if the number (N) of SSBs with which the RO is associated is greater than 1, the number (R") of preambles of the second type of CFRA occupied by each SSB is equal to a total number of preambles in an RO used for the second type of CFRA and the second type of CBRA (msgA-TotalNumberOf-Preambles) divided by N and then subtracted by the number (R') of preambles of the second type of CBRA occupied by each SSB.

In the configuration form 2 of the RO, in the RO, the R" consecutive preambles of the second type of CFRA are located after the R' consecutive preambles of the second type of CBRA.

Figure 6A:
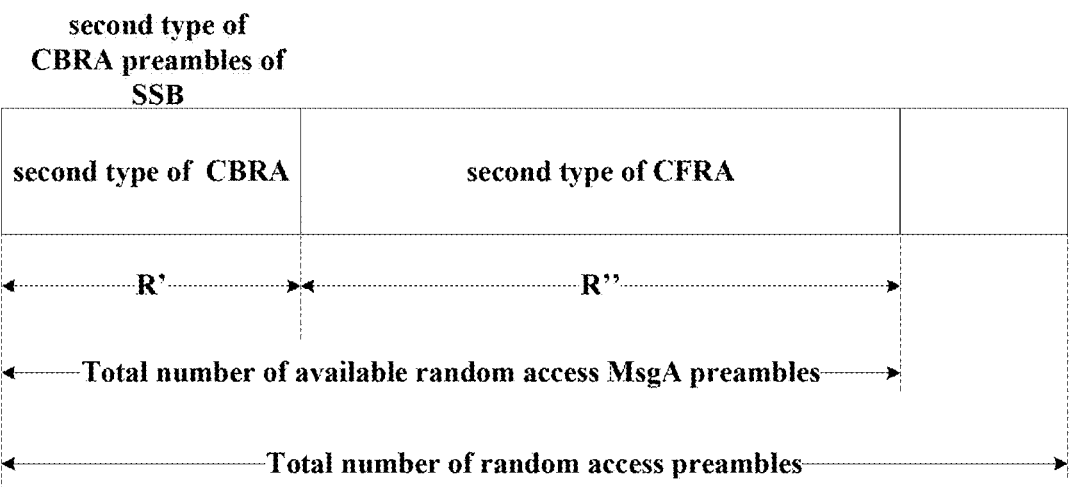
FIG. 6A is a schematic diagram of a configuration form 2 of an RO.

FIG. 6A is a schematic diagram of configuration form 2 of an RO.

As shown in FIG. 6A, the number (N) of SSBs associated with the RO is <1, and a total number of preambles in one RO used for the second type of CBRA and the second type of CFRA is msgA-TotalNumberOf_Preambles, then R"=msgA-TotalNumberOf-Preambles-R'. Preambles of former R' consecutive indices of each RO are used for the second type of CBRA mapped to the SSB of the RO, and msgA-TotalNumberOfRA-Preambles-R' consecutive preambles after the preambles of the second type of CBRA may be used for the second type of CFRA.

Figure 6B:
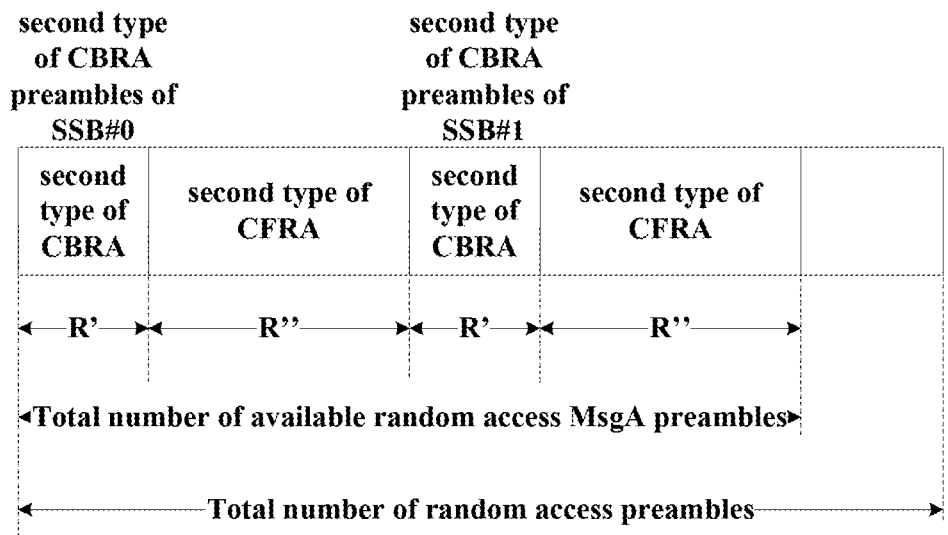
FIG. 6B is another schematic diagram of the configuration form 2 of the RO.

FIG. 6B is another schematic diagram of configuration form 2 of the RO.

As shown in FIG. 6B, the number (N) of the SSBs associated with the RO is greater than 1, for example, N=2. Preambles mapped to SSB #n (0<n≤N−1) are consecutive preambles of R' preambles starting from an index n*msgA-TotalNumberOfRA-Preambles/N and used for the second type of CBRA preambles, and R" consecutive preambles after the preambles of the second type of CBRA are used for the second type of CFRA.

In RO configuration form 2, the SSB-based RO of the second type of CFRA may further be shared with the first type of CFRA, wherein the second type of CFRA and the first type of CFRA in the shared RO use different preambles. The configuration of the shared RO further includes: a total number of random access preambles available in an RO (TotalNumberOfRA-Preambles).

Figure 6C:
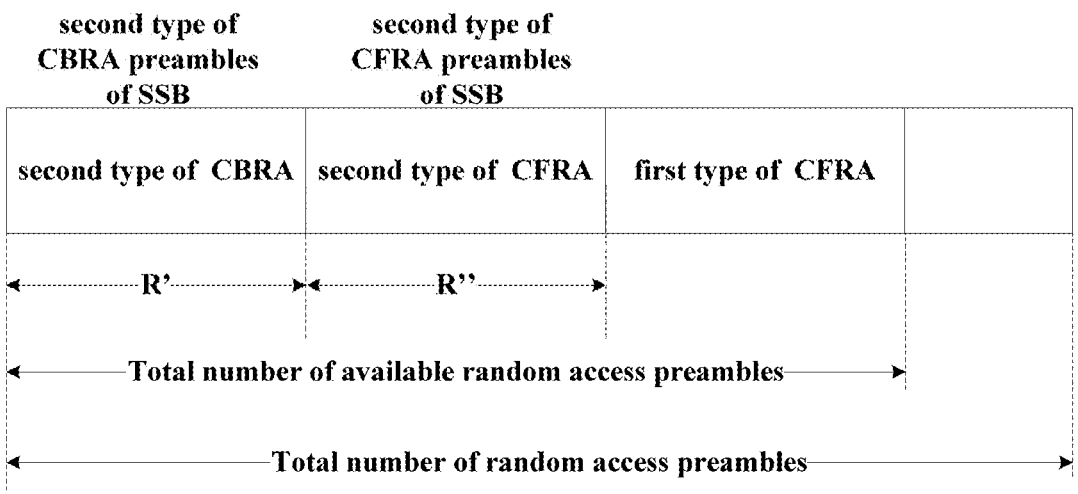
FIG. 6C is a further schematic diagram of the configuration form 2 of the RO.

FIG. 6C is a further schematic diagram of the configuration form 2 of the RO.

As shown in FIG. 6C, N≤1. A total number of preambles used for the second type of CBRA and the second type of CFRA in an RO is msgA-TotalNumberOf_Preambles, then, R"=msgA-TotalNumberofRA-Preambles-R'. Preamble of former R' consecutive indices of each RO are used for the second type of CBRA of the SSBs mapped to the RO, R" consecutive preambles after the preambles of the second type of CBRA are used for the second type of CFRA, and TotalNumberOfRA-Preambles-preamble-msgA-TotalNumberOf_Preambles preambles remained in the RO may be used for the first type of CFRA.

Figure 6D:
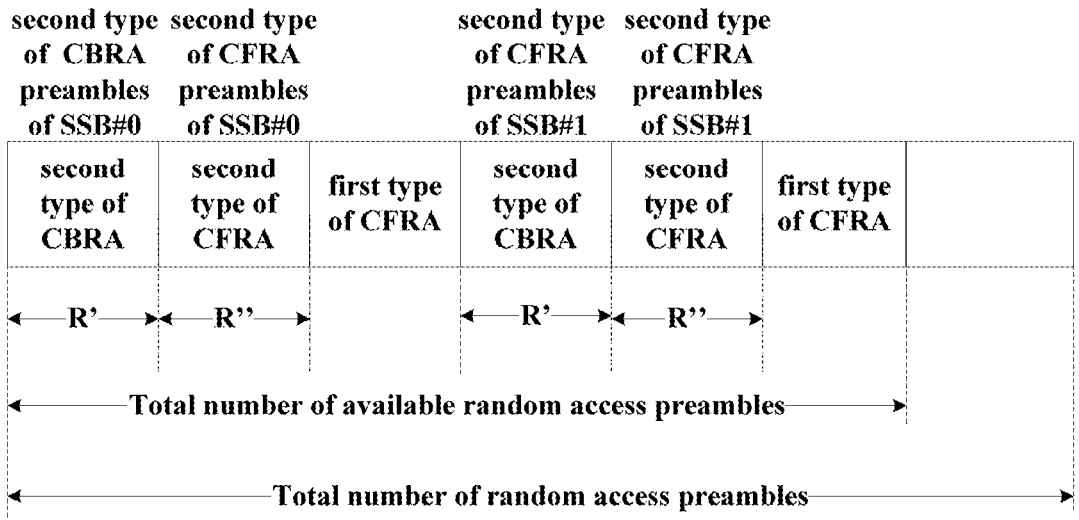
FIG. 6D is still another schematic diagram of the configuration form 2 of the RO.

FIG. 6D is still another schematic diagram of the configuration form 2 of the RO.

As shown in FIG. 6D, N>1. Preambles mapped to SSB #n (0<=n<N−1) are R' consecutive preambles starting from an index n*TotalNumberOfRA-Preambles/N and are for preambles of the second type of CBRA, R" consecutive preambles after the preambles of the second type of CBRA are used for the second type of CFRA, and remaining TotalNumberOfRA-Preambles-preamble-msgA-TotalNumberOf_Preambles preambles may be used for the first type of CFRA.

Configuration Form 3 of the RO

In configuration form 3 of the RO, the SSB-based RO of the second type of CFRA is shared with the first type of CBRA, wherein the second type of CFRA and the first type of CBRA in the shared RO use different preambles.

The configuration of the shared RO includes: a total number of random access preambles available on an RO (TotalNumberOfRA-Preambles), the number (N) of SSBs associated with the RO, the number (R") of preambles of the second type of CFRA occupied by each SSB, and the number (R) of preambles of the first type of CBRA occupied by each SSB.

In the RO, R" consecutive preambles of the second type of CFRA are located after R consecutive preambles of the second type of CBRA.

In addition, in configuration form 3 of the RO, the SSB-based RO of the second type of CFRA may further be shared with the first type of CFRA, wherein in the shared RO, the second type of CFRA and the first type of CFRA use different preambles. Moreover, the SSB-based RO of the second type of CFRA may not be shared with the first type of CFRA.

Figure 7A:
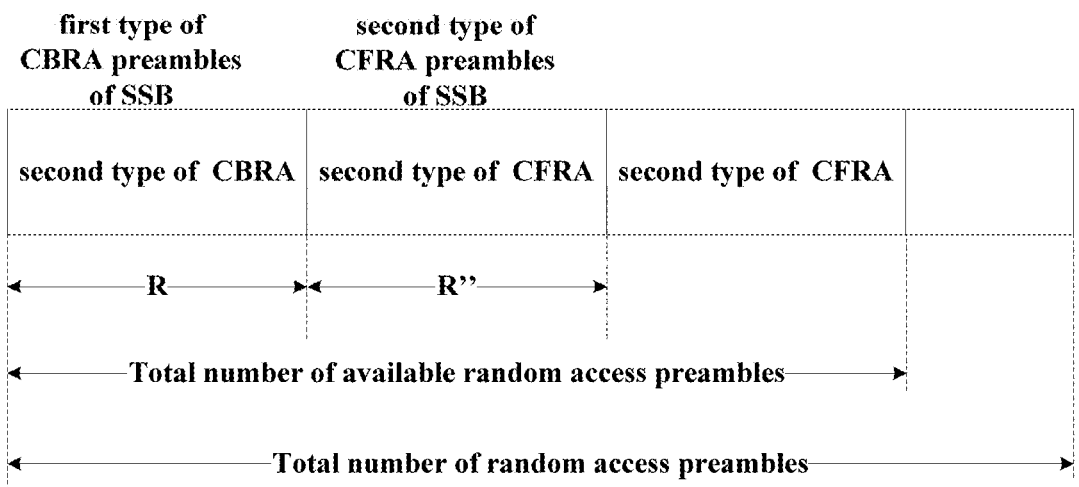
FIG. 7A is a schematic diagram of a configuration form 3 of an RO.

FIG. 7A is a schematic diagram of configuration form 3 of the RO.

As shown in FIG. 7A, in a case where N≤1, preambles of former R consecutive indices of each RO are used to be mapped to the first type of CBRA of SSBs of the RO, R" consecutive preambles after the preambles of the first type of CBRA may be used for the second type of CFRA, and remaining TotalNumberOfRA-Preambles-R-R" consecutive preambles may be used for the first type of CFRA.

Figure 7B:
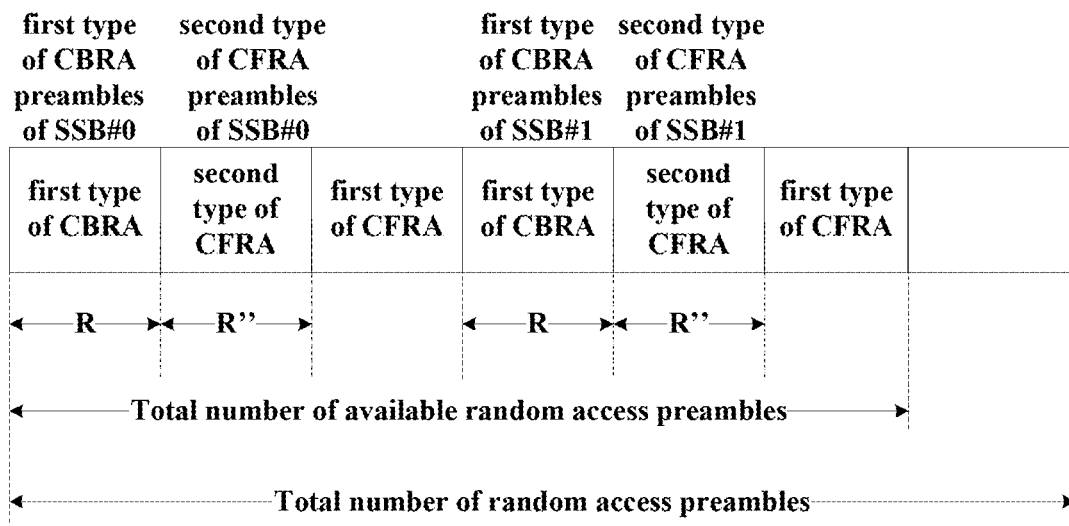
FIG. 7B is another schematic diagram of the configuration form 3 of the RO.

FIG. 7B is another schematic diagram of configuration form 3 of the RO.

As shown in FIG. 7B, in a case where N>1, preambles mapped to SSB #n (0≤n<N−1) are R consecutive preambles starting from an index n*TotalNumberOfRA-Preambles/N and are used for the preambles of the first type of CBRA, R" consecutive preambles after the preambles of the first type of CBRA are used for the second type of CFRA; and remaining TotalNumberOfRA-Preambles-N*R-N*R" preambles may be used for the first type of CFRA.

Configuration Form 4 of the RO

In configuration form 4 of the RO, the SSB-based RO of the second type of CFRA is configured independently of the RO of the first type of CBRA and the second type of CBRA.

In configuration form 4 of the RO, the configuration of the RO of the second type of CFRA includes: a total number of random access preambles available on the RO (TotalNumberOfRA-Preambles) and the number (N) of SSBs associated with the RO.

In configuration form 4 of the RO, the SSB-based RO of the second type of CFRA may also be shared with the first type of CFRA. In the case where the SSB-based RO of the second type of CFRA shares configuration with the first type of CFRA, the configuration of the RO further includes: the number (R") of preambles of the second type of CFRA occupied by each SSB on an RO.

Figure 8A:
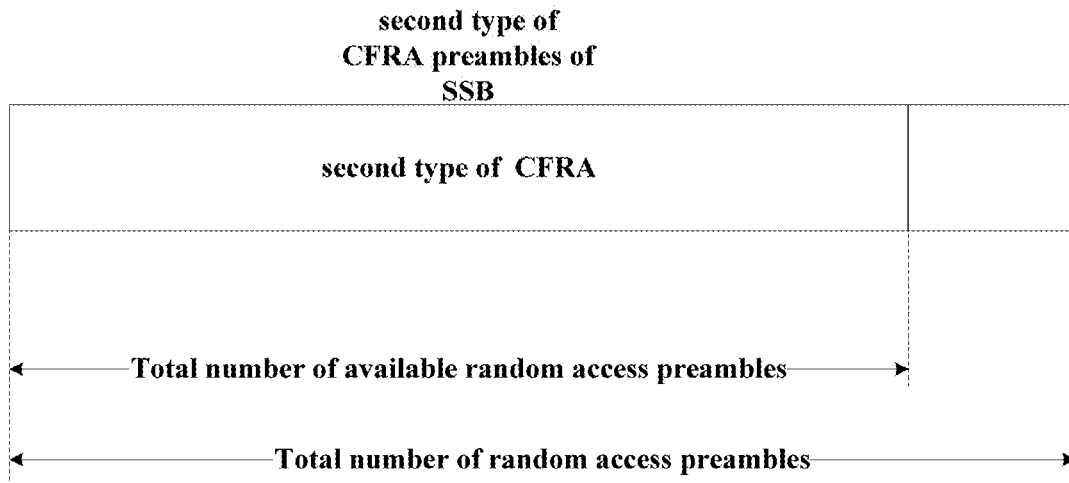
FIG. 8A is a schematic diagram of a configuration form 4 of an RO.

FIG. 8A is a schematic diagram of configuration form 4 of the RO.

As shown in FIG. 8A, if N<1, each SSB is mapped to 1/N consecutive valid ROs. Former TotalNumberOfRA-Preambles preambles in each RO are used for the second type of CFRAs mapped to the SSB of the RO.

Figure 8B:
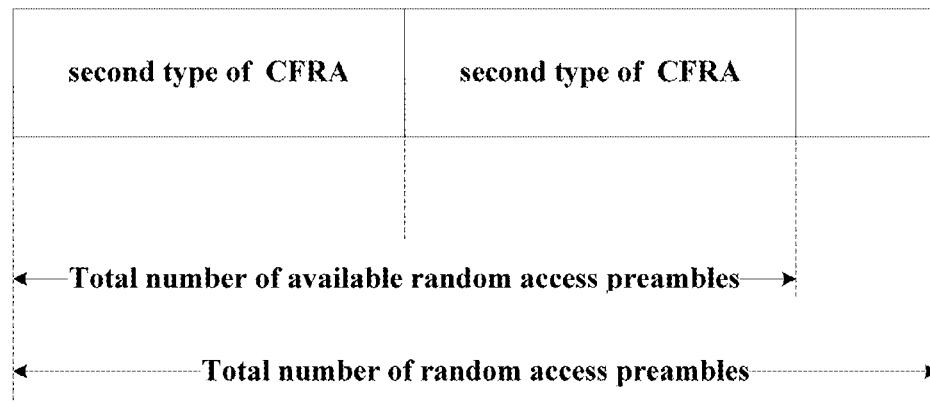
FIG. 8B is another schematic diagram of the configuration form 4 of the RO.

FIG. 8B is another schematic diagram of the configuration form 4 of the RO.

As shown in FIG. 8B, N>1, and N SSBs are mapped to an RO, for example, N=2. Former TotalNumberOfRA-Preambles preambles in each RO are used for the second type of CFRA mapped to the SSB of the RO. The preambles mapped to SSB #n (0≤n<N−1) are TotalNumberOfRA-Preambles/N consecutive preambles starting from an index n*TotalNumberOfRA-Preamblesr/N and are for the second type of CFRA.

Figure 8C:
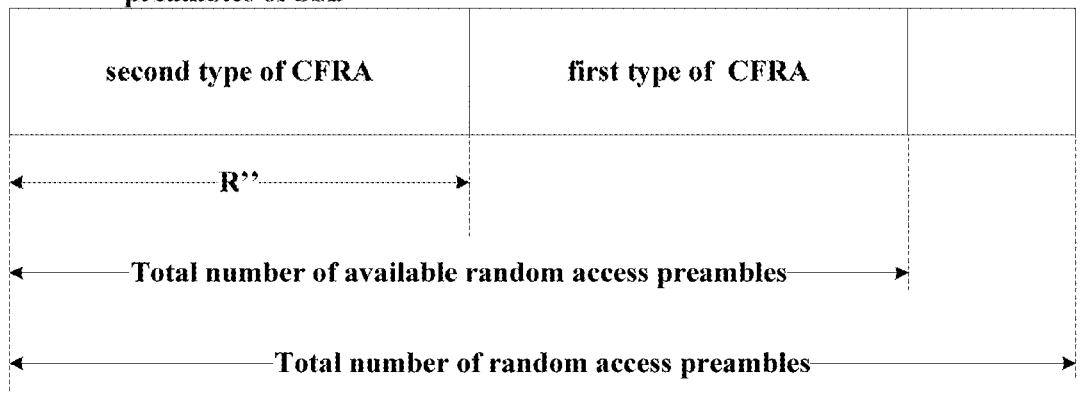
FIG. 8C is a further schematic diagram of the configuration form 4 of the RO.

FIG. 8C is a further schematic diagram of configuration form 4 of the RO.

As shown in FIG. 8C, the SSB-based RO of the second type of CFRA shares configuration with the first type of CFRA. N<1, and each SSB is mapped to 1/N consecutive valid ROs. Preambles of former R" consecutive indices of each RO are used for the second-type of CBRA mapped to the SSB of the RO, and consecutive TotalNumberOfRA-Preamblesr−R" preambles after the preambles of the second type of CBRA may be used for the second-type of CFRA.

Figure 8D:
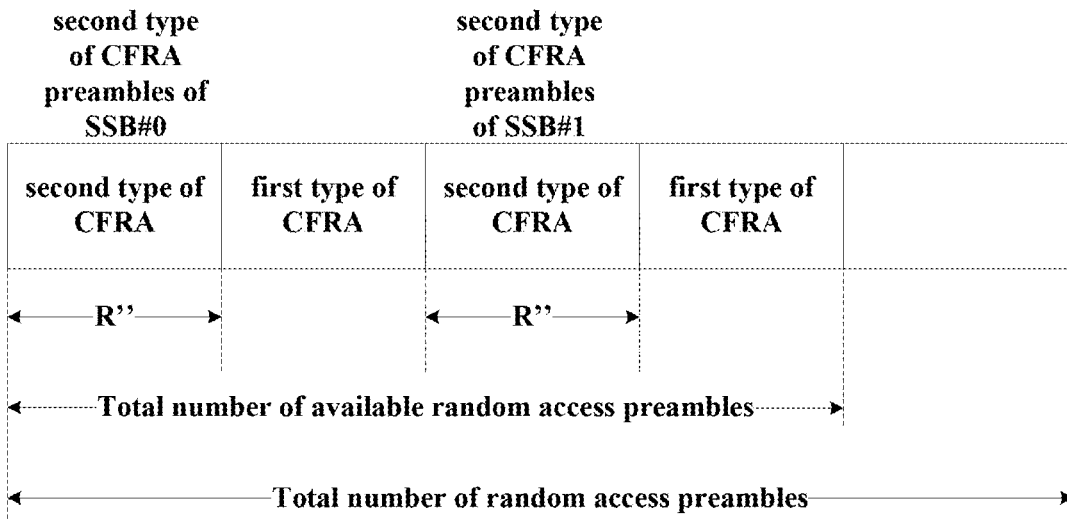
FIG. 8D is still another schematic diagram of the configuration form 4 of the RO.

FIG. 8D is still another schematic diagram of configuration form 4 of the RO.

As shown in FIG. 8D, the SSB-based RO of the second type of CFRA shares configuration with the first type of CFRA. N>1, and N SSBs are mapped to an RO. Preambles mapped to SSB #n (0≤n<N−1) are R" consecutive preambles starting from an index n*TotalNumberOfRA-Preambles/N and are used for the preambles of the second type of CFRA, and TotalNumberOfRA-Preamblesr/N-R" consecutive preambles after the preambles of the second type of CFRA may be used for the first type of CFRA.

In the first aspect of the embodiments, in RO configuration form 1, RO configuration form 2 or RO configuration form 3, sharing an RO refers to that RO configurations are identical, and RO resources are identical or overlap, but different preambles are used; and in RO configuration form 4, the independent RO refers to that the RO configurations are different, and the RO resources are different or do not overlap.

In the first aspect of the embodiments, in a case where the configuration of the RO is the configuration form 1 of the RO, the configuration form 2 of the RO, or the configuration form 3 of the RO, the configuration information of the RO of the second type of CFRA is carried in system information. And in a case where the configuration of the RO is configuration form 4 of the RO, the configuration information of the RO of the second type of CFRA is carried in dedicated radio resource control (RRC) signaling.

For example, in the case where the configuration information of the RO of the second type of CFRA is carried in the dedicated RRC signaling, the terminal equipment may use the RO configuration information of the second type of CFRA carried by the dedicated RRC signaling; otherwise, the terminal equipment uses the RO configuration information of the second type of CFRA carried by the system information.

In the first aspect of the embodiments of this disclosure, the preambles of the second type of CFRA may not be divided into more than two preamble groups. In addition, the preambles of the second type of CFRA may be divided into two or more preamble groups, wherein the RO configuration includes the number of preambles occupied by at least one preamble group, each preamble group being respectively associated with a PUSCH configuration.

The configuration of the RO in the case where the preambles of the second type of CBRA are grouped shall be described below by taking the second type of CBRA and that the preambles of the second type of CFRA are divided into group A/group B as an example.

Figure 9A:
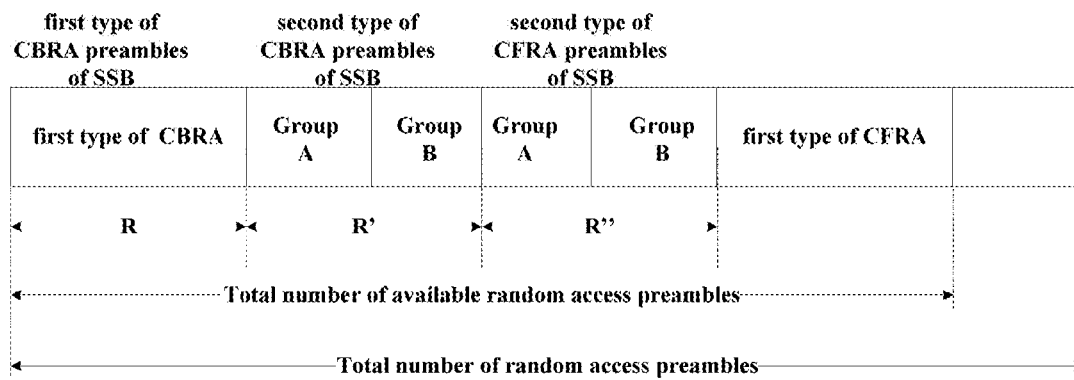
FIG. 9A is a schematic diagram of the second type of CFRA and the second type of CBRA in configuration form 1 of the RO that are respectively divided into two groups.

FIG. 9A is a schematic diagram of the second type of CFRA and the second type of CBRA in configuration form 1 of the RO that are respectively divided into two groups. As shown in FIG. 9A, N≤1, one SSB is mapped to 1/N ROs.

Figure 9B:
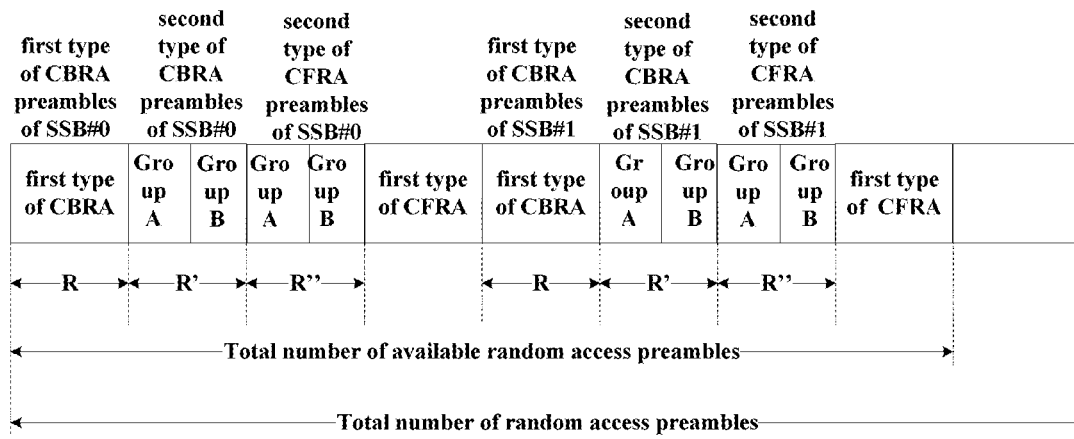
FIG. 9B is another schematic diagram of the second type of CFRA and the second type of CBRA in configuration form 1 of the RO that are respectively divided into two groups.

FIG. 9B is another schematic diagram of the second type of CFRA and the second type of CBRA in configuration form 1 of the RO that are respectively divided into two groups. As shown in FIG. 9B, N>1, N SSBs are mapped to an RO, for example, N=2.

Figure 9C:
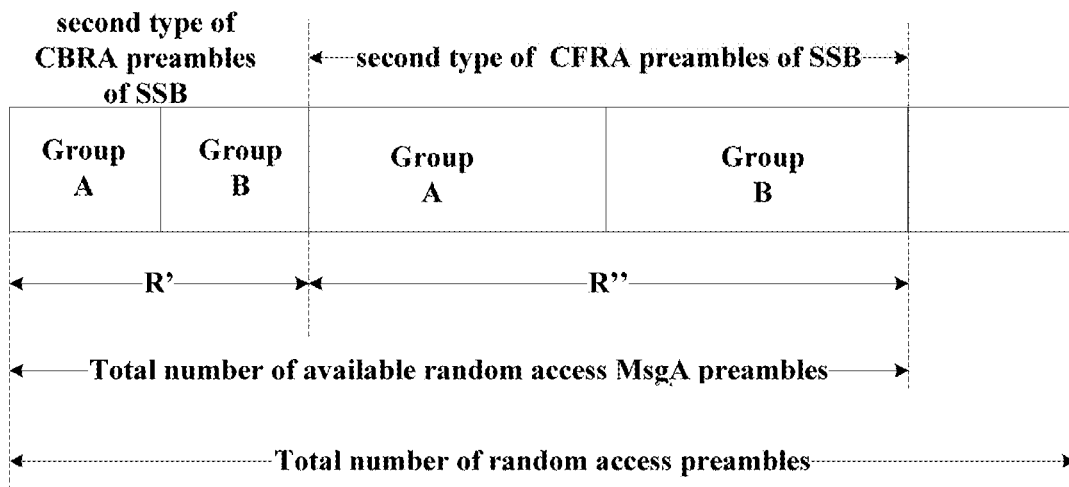
FIG. 9C is a schematic diagram of the second type of CFRA and the second type of CBRA in configuration form 2 of the RO that are respectively divided into two groups.

FIG. 9C is a schematic diagram of the second type of CFRA and the second type of CBRA in configuration form 2 of the RO that are respectively divided into two groups. As shown in FIG. 9C, N≤1, one SSB is mapped to 1/N ROs.

Figure 9D:
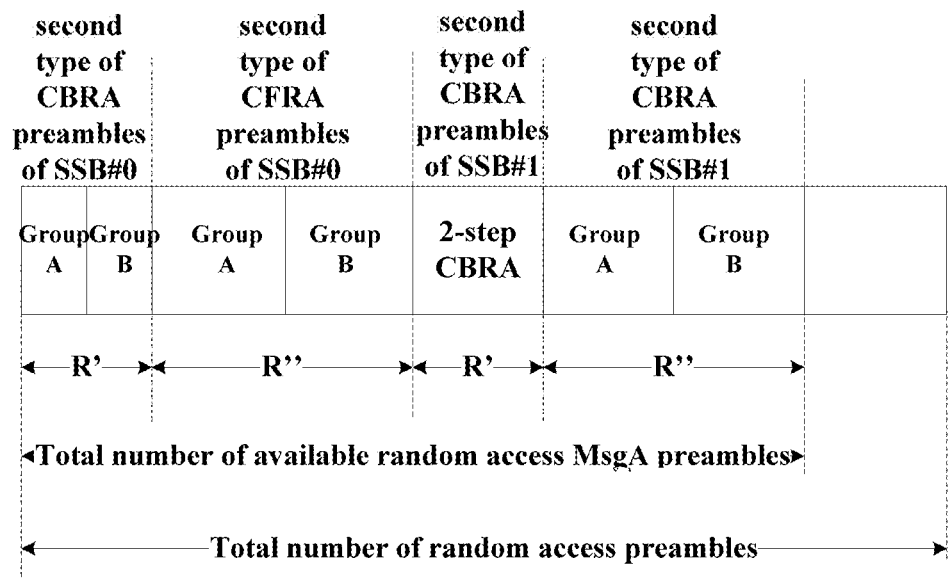
FIG. 9D is another schematic diagram of the second type of CFRA and the second type of CBRA in configuration form 2 of the RO that are respectively divided into two groups.

FIG. 9D is another schematic diagram of the second type of CFRA and the second type of CBRA in configuration form 2 of the RO that are respectively divided into two groups. As shown in FIG. 9D, N>1, N SSBs are mapped to an RO, for example, N=2.

Figure 9E:
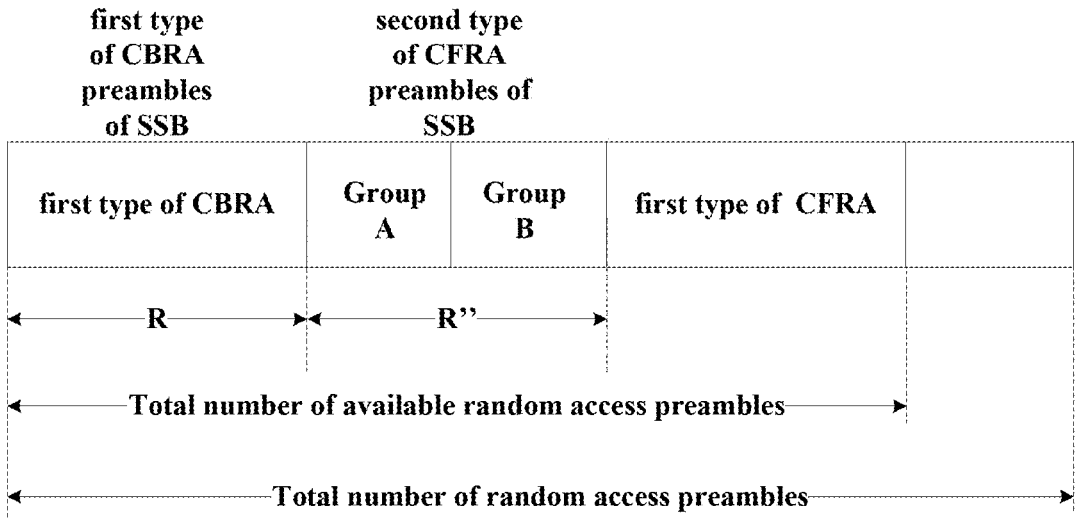
FIG. 9E is a schematic diagram of the second type of CFRA in configuration form 3 of the RO that is divided into two groups.
Figure 9F:
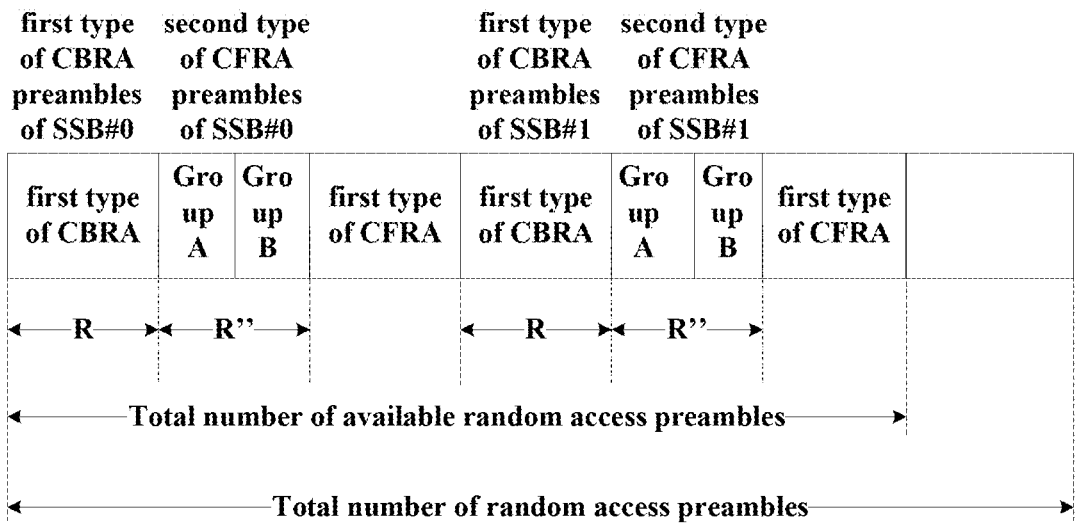
FIG. 9F is another schematic diagram of the second type of CFRA in configuration form 3 of the RO that is divided into two groups.

FIG. 9E is a schematic diagram of the second type of CFRA in configuration form 3 of the RO that is divided into two groups. As shown in FIG. 9E, N≤1, one SSB is mapped to 1/N ROs. FIG. 9F is another schematic diagram of the second type of CFRA in configuration form 3 of the RO that is divided into two groups. As shown in FIG. 9F, N>1, N SSBs are mapped to an RO, for example, N=2.

Figure 9G:
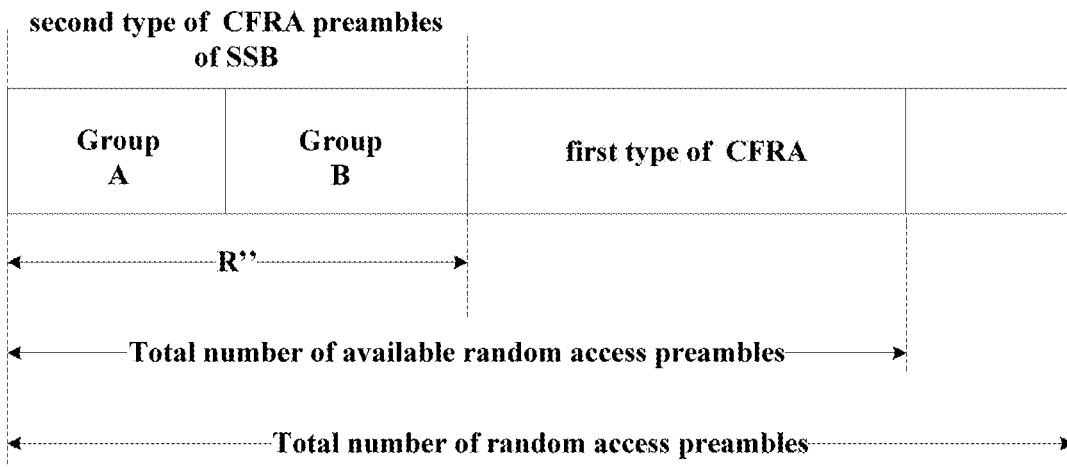
FIG. 9G is a schematic diagram of the second type of CFRA in configuration form 4 of the RO that is divided into two groups.
Figure 9H:
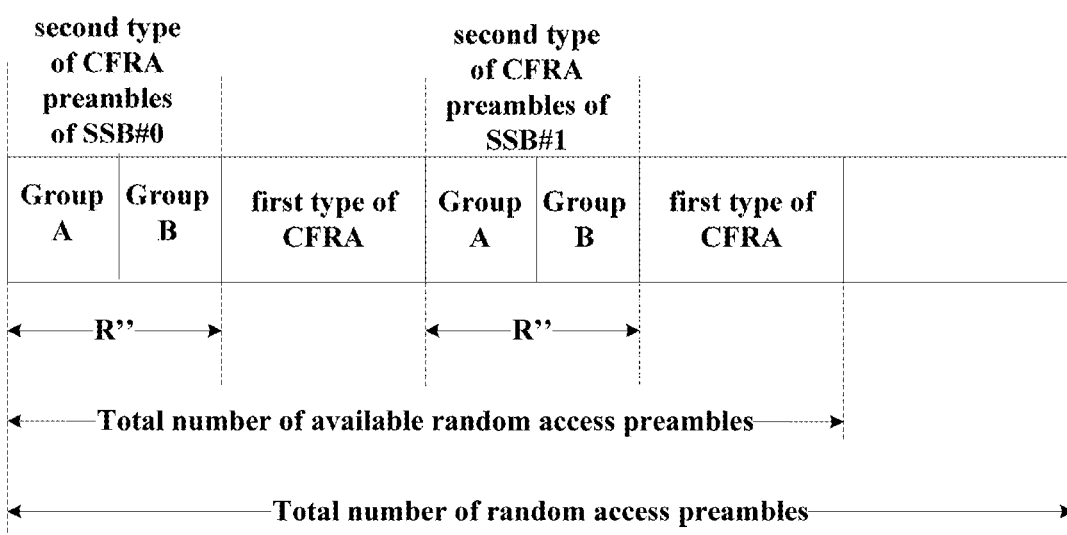
FIG. 9H is another schematic diagram of the second type of CFRA in configuration form 4 of the RO that is divided into two groups.

FIG. 9G is a schematic diagram of the second type of CFRA in configuration form 4 of the RO that is divided into two groups. As shown in FIG. 9G, N≤1, one SSB is mapped to 1/N ROs. FIG. 9H is another schematic diagram of the second type of CFRA in configuration form 4 of the RO that is divided into two groups. As shown in FIG. 9H, N>1, N SSBs are mapped to an RO, for example, N=2.

In FIGS. 9A-9H, preambles to which group A corresponds are located before preambles to which group B corresponds; however, this embodiment may not be limited thereto, and the preambles to which group A corresponds may also be located after the preambles to which group B corresponds.

The configuration of the PUSCH of the second type of CFRA shall be described below.

In the first aspect of the embodiments, in some embodiments, the configuration of the PUSCH of the second type of CFRA may include: a frequency-domain resource position of the PUSCH of the second message (MsgA), a periodic time-domain resource position of the PUSCH of MsgA and a modulation and coding scheme (MCS) of the PUSCH of MsgA.

In the first aspect of the embodiments, in other embodiments, the configuration of the PUSCH of the second type of CFRA may include: a modulation and coding scheme (MCS) of the PUSCH of the second message MsgA, the number of physical uplink shared channel occasions (POs) in a slot, a time-domain spacing between POs, the number of slots including POs, a time offset between a PO and an RO, a time-domain starting position of a PO, the number of POs multiplexed in the frequency domain in the same time, configuration of a demodulation reference signal (DMRS) of a PO, a frequency-domain spacing between POs, and a frequency-domain starting physical resource block (PRB) of a PO, wherein a period of the PO is identical to that of the RO.

In the first aspect of the embodiments, the configuration of the PUSCH may be in various forms.

PUSCH Configuration Form 1

In the PUSCH configuration form 1, a PUSCH of the second type of CFRA and a PUSCH of the second type of CBRA share configuration, that is, some PUSCH resource units (PRUs) in PUSCH resources indicated by identical PUSCH configurations belong to the second type of CBRA, and some PRUs belong to the second type of CFRA.

In configuration form 1 of the PUSCH, there exists a predetermined mapping relationship between preambles of the second information (MsgA) and the PUSCH associated with the RO. Wherein, in the mapping relationship, K second information (MsgA) preambles are taken as a group and mapped onto an available physical uplink shared channel occasion.

For example, K=ceil(Npreamble/Npusch); where, Npreamble is a total number of preambles of second information (MsgA) of the second type of CFRA and preambles of second information (MsgA) of the second type of CBRA in all available physical random access channel occasions in a mapping period of synchronization signal blocks (SSBs) and physical random access channel (PRACH) occasions, and Npusch is a product of a total number k1 of physical uplink shared channel (PUSCH) occasions and the number n1 of demodulation reference signal (DMRS) indices in a physical uplink shared channel (PUSCH) occasion in a mapping period of the synchronization signal blocks (SSBs) and physical random access channel (PRACH) occasions, that is, Npusch is a total number of PRUs in the mapping period of the synchronization signal blocks (SSBs) and physical random access channel occasions. K is an integer greater than or equal to 1, and a maximum value of K is, for example, 64. And ceil denotes a ceiling operation.

In at least one embodiment, the above mapping relationship may be obtained by the following operations:

operation 121: preambles of the second information (MsgA) in available physical random access channel occasions (PRACH occasions) of a slot are sorted in a first order, wherein the preambles of the second information (MsgA) include: preambles of the second information (MsgA) of second contention-based random access, and preambles of the second information (MsgA) of second contention-free random access; and operation 122: the preambles of the second information (MsgA) sorted in the first order are mapped onto the physical uplink shared channel occasions (PUSCH occasions) in a second order.

In operation 121, that preambles of the second information (MsgA) in available physical random access channel occasions (PRACH occasions) of a slot are sorted in a first order includes:

the preambles of the second information (MsgA) are sorted in a first predetermined order of preamble indices within a physical random access channel occasion, wherein the first predetermined order is, for example, an ascending order of the preamble indices; the preambles of the second information (MsgA) are sorted in a second predetermined order of frequency-domain resource indices of physical random access channel occasions within frequency-domain-multiplexed physical random access channel occasions, wherein the second predetermined order is, for example, an ascending order of the frequency-domain resource indices; and the preambles of the second information (MsgA) are sorted in a third predetermined order of time resource indices of physical random access channel occasions within time-domain-multiplexed physical random access channel occasions in a slot, wherein the third predetermined order is, for example, an ascending order of the time resource indices.

In operation 122, that the preambles of the second information (MsgA) sorted in the first order are mapped onto the physical uplink shared channel occasions (PUSCH occasions) in a second order includes:

for a frequency-domain-multiplexed physical uplink shared channel occasion, the preambles of the second information (MsgA) sorted in the first order are mapped onto the physical uplink shared channel occasion in a fourth predetermined order of frequency-domain resource indices fid of the physical uplink shared channel occasion, wherein the fourth predetermined order is, for example, an ascending order of the frequency-domain resource indices; in a physical uplink shared channel occasion, the preambles of the second information (MsgA) sorted in the first order are mapped onto the physical uplink shared channel occasion in a fifth predetermined order of demodulation reference signal (DMRS) indices $DMRS_{id}$ of the physical uplink shared channel occasion, wherein the fifth predetermined order is, for example, an ascending order of the demodulation reference signal (DMRS) indices; for a physical uplink shared channel occasion time-domain-multiplexed in a slot, the preambles of the second information (MsgA) sorted in the first order are mapped onto the physical uplink shared channel occasion in a sixth predetermined order of time resource indices Ed of the physical uplink shared channel occasion, wherein the sixth predetermined order is, for example, an ascending order of the time resource indices; and the preambles of the second information (MsgA) sorted in the first order are mapped onto the physical uplink shared channel occasion in a seventh predetermined order of slot indices of the physical uplink shared channel occasion, wherein the seventh predetermined order is, for example, an ascending order of the slot indices.

In configuration form 1 of the PUSCH, in one implementation, the preambles of the second type of CBRA may be divided into a preamble group A and a preamble group B, and the preambles of the second type of CFRA may be or may not be grouped. In this case, the preamble group A and the preamble group B of the second type of CBRA are respectively associated with one PUSCH configuration, and the PUSCH of the second type of CFRA shares configuration with the PUSCH associated with the preamble group A or the preamble group B. Hence, a size of a transport block corresponding to the PUSCH of the second type of CFRA is in consistence with that of a transport block corresponding to the PUSCH of the second type of CBRA, thereby avoiding recombination of MsgA in the random access procedure.

In configuration form 1 of the PUSCH, in another implementation, the preambles of the second type of CBRA may be divided into preamble group A and preamble group B, and the second type of CFRA may be divided into preamble group A and preamble group B or may not be grouped. In this case, the second type of CFRA has two PUSCH configurations (that is, the preamble group A and the preamble group B are respectively associated with one PUSCH configuration of the second type of CFRA), and the preamble group A and the preamble group B are respectively associated with a PUSCH configuration of the second type of CBRA. The two PUSCHs of the second type of CFRA share configuration respectively with the PUSCH associated with the preamble group A of the second type of CBRA and the PUSCH associated with the preamble group B of the second type of CBRA; for example, the PUSCH of second type of CFRA associated with the preamble group A shares the configuration with the PUSCH of the second-type of CBRA associated with the preamble group A, and the PUSCH of the second type of CFRA associated with preamble group B shares the configuration with the PUSCH of the second type of CBRA associated with the preamble group B.

Configuration Form 2 of the PUSCH

In the PUSCH configuration form 2, configuration of a PUSCH of the second type of CFRA is independent of configuration of a PUSCH of the second type of CBRA, that is, the configuration of the PUSCH of the second type of CFRA is different from the configuration of the PUSCH of the second type of CBRA, and a PUSCH resource of the second type of CBRA and a PUSCH resource of the second type of CFRA are completely different or do not overlap and are indicated by different PUSCH configurations.

In configuration form 2 of the PUSCH, there exists a predetermined mapping relationship between preambles of the second information (MsgA) of the second type of CFRA and the PUSCH associated with the RO. In the mapping relationship, every K second information (MsgA) preambles are taken as a group and mapped onto an available physical uplink shared channel occasion (PO).

For example, K=ceil(Npreamble/Npusch); where, Npreamble is the number of preambles of second information (MsgA) of the second type of CFRA in all available physical random access channel occasions in a mapping period of synchronization signal blocks (SSBs) and physical random access channel (PRACH) occasions, and Npusch is a product of a total number k1 of physical uplink shared channel (PUSCH) occasions and the number n1 of demodulation reference signal (DMRS) indices in a physical uplink shared channel (PUSCH) occasion in a mapping period of the synchronization signal blocks (SSBs) and physical random access channel (PRACH) occasions, that is, Npusch is a total number of PRUs in the mapping period of the synchronization signal blocks (SSBs) and physical random access channel occasions. K is an integer greater than or equal to 1, and a maximum value of K is, for example, 64. And ceil denotes a ceiling operation.

In at least one embodiment, the above mapping relationship may be obtained by the following operations:

operation 131: preambles of the second information (MsgA) of the second type of CFRA in available physical random access channel occasions (PRACH occasions) of a slot are sorted in a first order; and operation 132: the preambles of the second information (MsgA) sorted in the first order are mapped onto the physical uplink shared channel occasions (PUSCH occasions) in a second order.

In operation 131, that preambles of the second information (MsgA) of the second type of CFRA in available physical random access channel occasions (PRACH occasions) of a slot are sorted in a first order includes:

the preambles of the second information (MsgA) are sorted in a first predetermined order of preamble indices within a physical random access channel occasion, wherein the first predetermined order is, for example, an ascending order of the preamble indices; the preambles of the second information (MsgA) are sorted in a second predetermined order of frequency-domain resource indices of physical random access channel occasions within frequency-domain-multiplexed physical random access channel occasions, wherein the second predetermined order is, for example, an ascending order of the frequency-domain resource indices; and the preambles of the second information (MsgA) are sorted in a third predetermined order of time resource indices of physical random access channel occasions within time-domain-multiplexed physical random access channel occasions in a slot, wherein the third predetermined order is, for example, an ascending order of the time resource indices.

In operation 132, that the preambles of the second information (MsgA) sorted in the first order are mapped onto the physical uplink shared channel occasions (PUSCH occasions) in a second order includes:

for a frequency-domain-multiplexed physical uplink shared channel occasion, the preambles of the second information (MsgA) sorted in the first order are mapped onto the physical uplink shared channel occasion in a fourth predetermined order of frequency-domain resource indices fid of the physical uplink shared channel occasion, wherein the fourth predetermined order is, for example, an ascending order of the frequency-domain resource indices; in a physical uplink shared channel occasion, the preambles of the second information (MsgA) sorted in the first order are mapped onto the physical uplink shared channel occasion in a fifth predetermined order of demodulation reference signal (DMRS) indices $DMRS_{id}$ of the physical uplink shared channel occasion, wherein the fifth predetermined order is, for example, an ascending order of the demodulation reference signal (DMRS) indices; for a physical uplink shared channel occasion time-domain-multiplexed in a slot, the preambles of the second information (MsgA) sorted in the first order are mapped onto the physical uplink shared channel occasion in a sixth predetermined order of time resource indices $T_{id}$ of the physical uplink shared channel occasion, wherein the sixth predetermined order is, for example, an ascending order of the time resource indices; and the preambles of the second information (MsgA) sorted in the first order are mapped onto the physical uplink shared channel occasion in a seventh predetermined order of slot indices of the physical uplink shared channel occasion, wherein the seventh predetermined order is, for example, an ascending order of the slot indices.

In configuration form 2 of the PUSCH, in one implementation, the preambles of the second type of CBRA may be divided into a preamble group A and a preamble group B. In this case, the preamble group A and the preamble group B of the second type of CBRA are respectively associated with one PUSCH configuration, and a size of a transport block (TB) based on the PUSCH configuration of the second type of CFRA is in consistence with that of a transport block based on the PUSCH configuration with which preamble group A or preamble group B is associated. Hence, a size of a transport block corresponding to the PUSCH of the second type of CFRA is in consistence with that of a transport block corresponding to the PUSCH of the second type of CBRA, which may avoid recombination of MsgA in the random access procedure.

In configuration form 2 of the PUSCH, in another implementation, the preambles of the second type of CBRA may be divided into preamble group A and preamble group B, and the second type of CFRA may be divided into preamble group A and preamble group B or may not be grouped. In this case, the preambles of the second type of CFRA may be associated with two PUSCH configurations (that is, the preamble group A and the preamble group B are respectively associated with one PUSCH configuration of the second type of CFRA), and the preamble group A and the preamble group B are respectively associated with a PUSCH configuration of the second type of CBRA. Sizes of TBs of the two PUSCHs with which the preambles based on the second type of CFRA are associated are respectively in consistence with sizes of TBs of the two PUSCHs with which the preambles based on the second type of CBRA are associated; for example, the sizes of the TBs of the PUSCH configurations based on the second type of CFRA with which the preamble group A is associated are in consistence with the sizes of the TBs of the PUSCH configurations based on the second type of CBRA with which the preamble group A is associated, and the sizes of the TBs of the PUSCH configurations based on the second type of CFRA with which the preamble group B is associated are in consistence with the sizes of the TBs of the PUSCH configurations based on the second type of CFRA with which the preamble group B is associated. Hence, a size of a transport block corresponding to the PUSCH of the second type of CFRA is in consistence with that of a transport block corresponding to the PUSCH of the second type of CBRA, which may avoid recombination of MsgA in the random access procedure.

In the first aspect of the embodiments of this disclosure, the configuration information of the PUSCH of the second type of CFRA may be carried in dedicated RRC signaling or system information. For example, in the case where the dedicated RRC signaling carries the configuration information of the PUSCH of the second type of CFRA, the terminal equipment uses the configuration information of the PUSCH of the second type of CFRA carried by the dedicated RRC signaling; otherwise, the terminal equipment uses the configuration information of the PUSCH of the second type of CFRA carried by the system information.

According to the first aspect of the embodiments, the terminal equipment receives the resource configuration of the second type of contention-free random access (CFRA), hence, the terminal equipment may perform the second type of CFRA, thereby reducing transmission latency of the PUSCH.

Second Aspect of the Embodiments

The second aspect of the embodiments of this disclosure relates to a random access method, which is applied to a network device, such as the network device 301.

Figure 10:
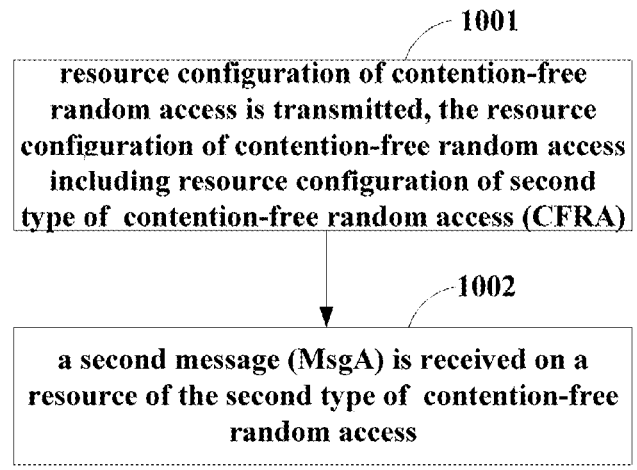
FIG. 10 is a schematic diagram of the random access method of the second aspect of the embodiments of this disclosure.

FIG. 10 is a schematic diagram of the random access method of the second aspect of the embodiments of this disclosure. As shown in FIG. 5, the random access method may include:

operation 1001: resource configuration of contention-free random access is transmitted, the resource configuration of contention-free random access including resource configuration of second type of contention-free random access (CFRA); and operation 1002: a second message (MsgA) is received on a resource of the second type of contention-free random access.

The resource configuration of the second type of CFRA includes: a second type of CFRA preamble index associated with a synchronization signal block (SSB) or a channel state information reference signal (CSI-RS), configuration of a physical random access channel occasion (RO) of the second message (MsgA), and configuration of a physical uplink shared channel (PUSCH) of MsgA.

In the second aspect of the embodiments of this disclosure, the network device transmits the resource configuration of the second type of contention-free random access (CFRA) to the terminal equipment, so that the terminal equipment may perform the second type of CFRA, thereby reducing transmission latency of the PUSCH.

In the resource configuration of the second type of CFRA transmitted in operation 1001, the RO may have various configuration forms.

Configuration Form 1 of the RO

In at least one embodiment, an SSB-based RO of the second type of CFRA is shared with the second type of CBRA, wherein in the shared RO, the second type of CFRA, the first type of CFRA and the second type of CBRA use different preambles.

The configuration of the shared RO includes:

a total number of random access preambles available in one RO (TotalNumberOfRA-Preambles), the number (N) of SSBs with which the RO is associated, the number (R) of preambles of the first type of CBRA occupied by each SSB, the number (R') of preambles of the second type of CBRA occupied by each SSB, and the number (R") of preambles of the second type of CFRA occupied by each SSB or a total number of preambles in the RO used for the second type of CFRA and the second type of CBRA (msgA-TotalNumberOf_Preambles).

If the number (N) of SSBs with which the RO is associated is less than or equal to 1, the number (R") of preambles of the second type of CFRA occupied by each SSB is equal to a total number of preambles in the RO used for the second type of CFRA and the second type of CBRA (msgA-TotalNumberOf-Preambles) subtracted by the number (R') of preambles of the second type of CBRA occupied by each SSB; and if the number (N) of SSBs with which the RO is associated is greater than 1, the number (R") of preambles of the second type of CFRA occupied by each SSB is equal to a total number of preambles in the RO used for the second type of CFRA and the second type of CBRA (msgA-TotalNumberOf-Preambles) divided by N and then subtracted by the number (R') of preambles of the second type of CBRA occupied by each SSB.

In the RO, R" consecutive preambles of the second type of CFRA are located after R' consecutive preambles of the second type of CBRA.

An SSB-based RO of the second type of CFRA may also be shared with the first type of CFRA, wherein in the shared RO, the second type of CFRA and the first type of CFRA use different preambles.

RO Configuration Form 2

The RO based on a synchronization signal block (SSB) of the second type of CFRA is shared with the second type of CBRA, wherein the second type of CFRA and the second type of CBRA in the shared RO use different preambles.

The configuration of the shared RO includes: a total number (msgA-TotalNumberOfRA-Preambles) of random access preambles of the second type of CFRA and the second type of CBRA available on an RO, the number (N) of SSBs with which the RO is associated, and the number (R') of preambles of the second type of CBRA occupied by each SSB.

If the number (N) of SSBs with which the RO is associated is less than or equal to 1, the number (R") of preambles of the second type of CFRA occupied by each SSB is equal to a total number (msgA-TotalNumberOf-Preambles) of preambles available in the RO subtracted by the number (R') of preambles of the second type of CBRA occupied by each SSB; and if the number (N) of SSBs with which the RO is associated is greater than 1, the number (R") of preambles of the second type of CFRA occupied by each SSB is equal to a total number of preambles in the RO used for the second type of CFRA and the second type of CBRA (msgA-TotalNumberOf-Preambles) divided by N and then subtracted by the number (R') of preambles of the second type of CBRA occupied by each SSB.

In the RO, the R" consecutive preambles of the second type of CFRA are located after the R' consecutive preambles of the second type of CBRA.

The SSB-based RO of the second type of CFRA may further be shared with the first type of CFRA, wherein the second type of CFRA and the first type of CFRA in the shared RO use different preambles. The configuration of the shared RO further includes: a total number of random access preambles available in an RO (TotalNumberOfRA-Preambles).

Configuration Form 3 of the RO

The SSB-based RO of the second type of CFRA is shared with the first type of CBRA, wherein the second type of CFRA and the first type of CBRA in the shared RO use different preambles.

The configuration of the shared RO includes: a total number of random access preambles available on an RO (TotalNumberOfRA-Preambles), the number (N) of SSBs associated with the RO, the number (R") of preambles of the second type of CFRA occupied by each SSB, and the number (R) of preambles of the first type of CBRA occupied by each SSB.

In the RO, R" consecutive preambles of the second type of CFRA are located after the R consecutive preambles of the second type of CBRA.

The SSB-based random access occasion (RO) of the second type of CFRA may further be shared with the first type of CFRA, wherein in the shared RO, the second type of CFRA and the first type of CFRA use different preambles.

In the configuration forms 1-3 of the RO, the configuration information of the RO of the second type of CFRA is carried in system information.

Configuration Form 4 of the RO

The SSB-based RO of the second type of CFRA is independent of the RO of the first type of CBRA and the second type of CBRA. The configuration of the RO of the second type of CFRA includes: a total number (TotalNumberOfRA-Preambles) of random access preambles available on an RO and the number (N) of SSBs with which the RO is associated.

The SSB-based RO of the second type of CFRA may further by shared with the first type of CFRA. The configuration of the RO further includes: the number (R″) of preambles of the second type of CFRA occupied by each SSB on the RO.

In configuration form 4 of the RO, the configuration information of the RO of the second type of CFRA is carried in dedicated radio resource control (RRC) signaling.

In the second aspect of the embodiments of this disclosure, the configuration of the PUSCH of the second type of CFRA includes: a frequency-domain resource position of the PUSCH of the second message (MsgA), a periodic time-domain resource position of the PUSCH of MsgA and an MCS of the PUSCH of MsgA.

In the second aspect of the embodiments of this disclosure, the configuration of the PUSCH of the second type of CFRA includes: a modulation and coding scheme (MCS) of the PUSCH of the second message MsgA, the number of physical uplink shared channel occasions (POs) in a slot, a time-domain spacing between POs, the number of slots including POs, a time offset between a PO and an RO, a time-domain starting position of a PO, the number of POs multiplexed in the frequency domain in the same time, configuration of a demodulation reference signal (DMRS) of a PO, a frequency-domain spacing between POs, and a frequency-domain starting physical resource block (PRB) of a PO, wherein a period of the PO is identical to that of the RO.

In the second aspect of the embodiments, the configuration of the PUSCH may be in various forms.

Configuration form 1 of the PUSCH

A PUSCH of the second type of CFRA and a PUSCH of the second type of CBRA share configuration.

K preambles of the second information (MsgA) are mapped onto an available PO, K being an integer greater than or equal to 1. For example, the preambles of the second information (msgA) in the RO available in one slot are sorted in a first order and mapped onto the PO in a second order, wherein the preambles of the second information (msgA) include the preambles of the second type of CFRA and the preambles of the second type of CBRA.

K=ceil(Npreamble/Npusch); where, Npreamble is a total number of preambles of the second type of CFRA and preambles of the second type of CBRA in all available occasions in a mapping period of synchronization signal blocks (SSBs) and physical random access channel (PRACH) occasions, and Npusch is a product of a total number of POs in the mapping period of the SSBs and the POs and the number of DMRS indices in the PO.

The preamble group A and the preamble group B of the second type of CBRA are respectively associated with a PUSCH configuration, and the PUSCH of the second type of CFRA shares configuration with the PUSCH associated with the preamble group A or the preamble group B; or, the preambles of the second type of CFRA are associated with two PUSCH configurations, and the preamble group A and the preamble group B of the second type of CBRA are respectively associated with a PUSCH configuration, and the two PUSCH configurations with which the preambles of the second type of CFRA are associated share configuration respectively with the PUSCH associated with the preamble group A and the PUSCH associated with the preamble group B.

Configuration Form 2 of the PUSCH

Configuration of a PUSCH of the second type of CFRA is independent of configuration of a PUSCH of the second type of CBRA.

K preambles of the second type of CFRA are mapped onto an available PO, K being an integer greater than or equal to 1. For example, the preambles of the second type of CFRA in the RO available in one slot are sorted in a first order and mapped onto the PO in a second order.

K=ceil(Npreamble/Npusch); where, Npreamble is a total number of preambles of the second type of CFRA in all available occasions in a mapping period of SSBs and POs, and Npusch is a product of a total number of POs in the mapping period of the SSBs and the POs and the number of DMRS indices in the PO.

The preamble group A and the preamble group B of the second type of CBRA are respectively associated with a PUSCH configuration, and a size of a transport block (TB) based on the PUSCH configuration of the second type of CFRA is in consistence with a size of a TB based on the PUSCH configuration with which the preamble group A or the preamble group B is associated; or, the preambles of the second type of CFRA are associated with two PUSCH configurations, the preamble group A and the preamble group B of the second type of CBRA are respectively associated with a PUSCH configuration, and sizes of TBs based on the two PUSCH configurations of the second type of CFRA are respectively in consistence with a size of a TB based on the PUSCH configuration with which the preamble group A is associated and a size of a TB based on the PUSCH configuration with which the preamble group B is associated.

In the second aspect of this embodiment, the preambles of the second type of CFRA are divided into two or more preamble groups, and the RO configuration includes the number of preambles occupied by at least one preamble group; wherein each preamble group is associated with a PUSCH configuration.

Third Aspect of the Embodiments

The third aspect of the embodiments of this disclosure provides a random access apparatus, applicable to a terminal equipment, such as the terminal equipment 302.

Figure 11:
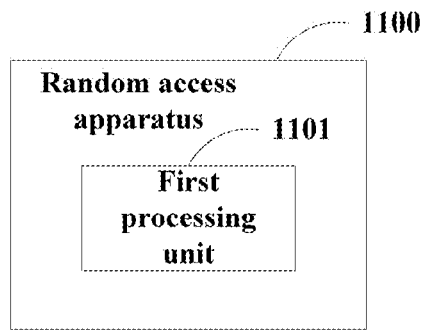
FIG. 11 is a schematic diagram of the random access apparatus of the third aspect of the embodiments of this disclosure.

FIG. 11 is a schematic diagram of the random access apparatus of the third aspect of the embodiments of this disclosure. As shown in FIG. 11, a random access apparatus 1100 includes a first processing unit 1101.

The first processing unit 1101 may carry out the random access method in the first aspect of the embodiments of this disclosure, and reference may be made to the description of the first aspect of the embodiments of this disclosure for carrying out the random access method by the first processing unit 1101.

Fourth Aspect of the Embodiments

The fourth aspect of the embodiments of this disclosure provides a random access apparatus, applicable to a network device, such as the network device 301.

Figure 12:
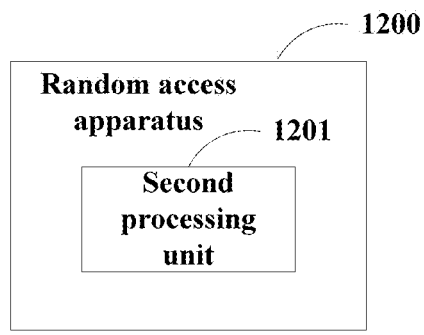
FIG. 12 is a schematic diagram of the random access apparatus of the fourth aspect of the embodiments of this disclosure.

FIG. 12 is a schematic diagram of the random access apparatus of the sixth aspect of the embodiments of this disclosure. As shown in FIG. 7, a random access apparatus 1200 includes a second processing unit 701.

The second processing unit 1201 may carry out the random access method in the second aspect of the embodiments of this disclosure, and reference may be made to the description of the second aspect of the embodiments of this disclosure for carrying out the random access method by the second processing unit 1201.

Fifth Aspect of the Embodiments

The fifth aspect of the embodiments of this disclosure provides a terminal equipment, including the random access apparatus 1100 as described in the third aspect of the embodiments.

Figure 13:
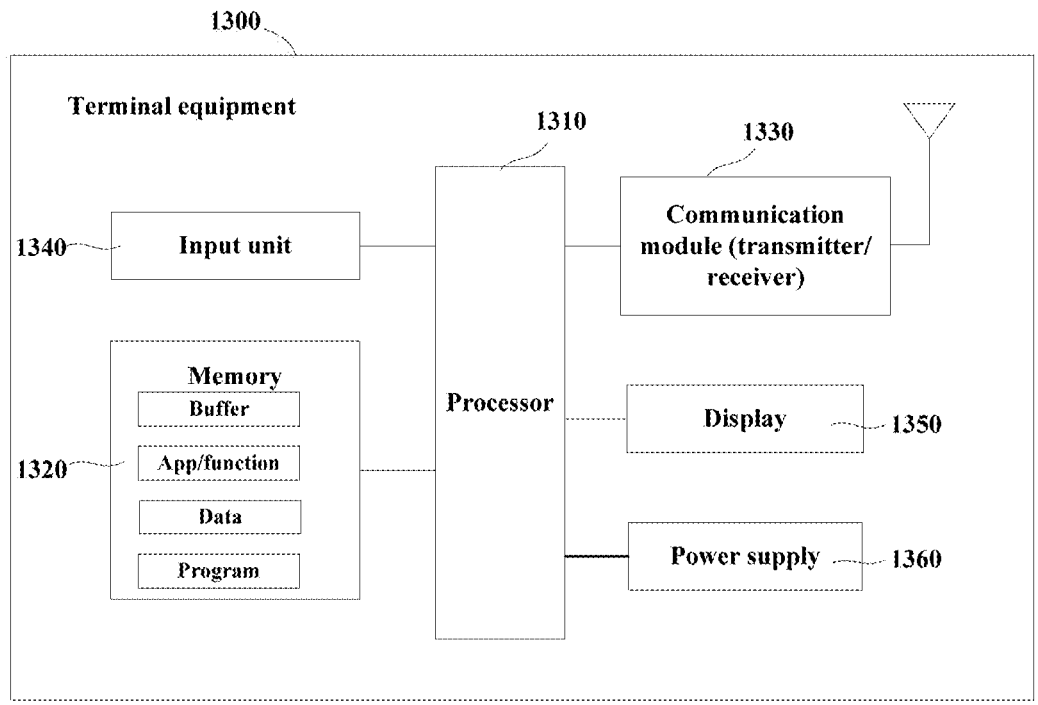
FIG. 13 is a block diagram of a systematic structure of the terminal equipment 1800 of the fifth aspect of the embodiments of this disclosure.

FIG. 13 is a block diagram of a systematic structure of a terminal equipment 1300 of the seventh aspect of the embodiments of this disclosure. As shown in FIG. 13, the terminal equipment 1300 may include a processor 1310 and a memory 1320, the memory 1320 being coupled to the processor 1310. It should be noted that this figure is illustrative only, and other types of structures may also be used, so as to supplement or replace this structure and achieve a telecommunications function or other functions.

In one implementation, the functions of the random access apparatus 1100 may be integrated into the processor 1310; wherein the processor 1310 may be configured to carry out the random access method described in the first aspect of the embodiments.

In another implementation, the random access apparatus 1100 and the processor 1310 may be configured separately; for example, the random access apparatus 1100 may be configured as a chip connected to the processor 1310, and the functions of the random access apparatus 1100 are executed under control of the processor 1310.

As shown in FIG. 13, the terminal equipment 1300 may further include a communication module 1330, an input unit 1340, a display 1350, and a power supply 1360. It should be noted that the terminal equipment 1300 does not necessarily include all the parts shown in FIG. 13; and furthermore, the terminal equipment 1300 may include parts not shown in FIG. 13, and the related art may be referred to.

As shown in FIG. 13, the processor 1310 is sometimes referred to as a controller or an operational control, which may include a microprocessor or other processor devices and/or logic devices. The processor 1310 receives input and controls operations of components of the terminal equipment 1300.

The memory 1320 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1310 may execute programs stored in the memory 1320, so as to realize information storage or processing, etc. Functions of other parts are similar to those of the related art, which shall not be described herein any further. The parts of the terminal equipment 1300 may be realized by specific hardware, firmware, software, or any combination thereof, without departing from the scope of this disclosure.

Sixth Aspect of the Embodiments

The sixth aspect of the embodiments of this disclosure provides a network device, including the random access apparatus 1200 as described in the second aspect of the embodiments.

Figure 14:
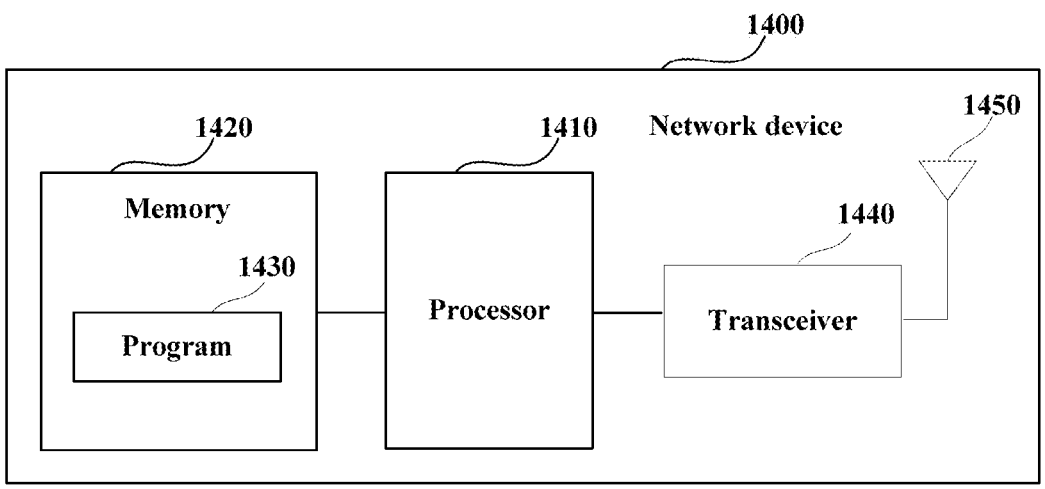
FIG. 14 is a schematic diagram of a structure of the network device of the sixth aspect of the embodiments of this disclosure.

FIG. 14 is a schematic diagram of a structure of the network device of the embodiment of this disclosure. As shown in FIG. 14, a network device 1400 may include a processor 1410 and a memory 1420, the memory 1420 being coupled to the processor 1410. The memory 1420 may store various data, and furthermore, it may store a program 1430 for data processing, and execute the program 1430 under control of the processor 1410, so as to receive various information transmitted by a user equipment, and transmit various information to the user equipment.

In one implementation, the functions of the random access apparatus 1200 may be integrated into the processor 1410. The processor 1410 may be configured to carry out the random access method described in the embodiment of the second aspect of the embodiments of this disclosure.

In another implementation, the random access apparatus 1200 and the processor 1410 may be configured separately; for example, the random access apparatus 1200 may be configured as a chip connected to the processor 1410, and the functions of the random access apparatus 1200 are executed under control of the processor 1410.

Furthermore, as shown in FIG. 14, the network device 1400 may include a transceiver 1440, and an antenna 1450, etc. Functions of the above components are similar to those in the related art, and shall not be described herein any further. It should be noted that the network device 1400 does not necessarily include all the parts shown in FIG. 14. Furthermore, the network device 1400 may include parts not shown in FIG. 14, and the related art may be referred to.

Seventh Aspect the Embodiments

The seventh aspect the embodiments of this disclosure provides a communication system, including the network device described in the sixth aspect of the embodiments and the terminal equipment described in the fifth aspect of the embodiments.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to implementations including the above embodiments, following supplements are further disclosed.

1. A method for configuring random access resources, applicable to a terminal equipment, the method including:

receiving resource configuration of contention-free random access, the resource configuration of contention-free random access including resource configuration of a second type of of contention-free random access (CFRA); and performing a second type of of contention-free random access procedure according to the resource configuration of the second type of of CFRA;

wherein the resource configuration of the second type of of CFRA includes a second type of of CFRA preamble index related to a synchronization signal block (SSB) or channel state information reference signal (CSI-RS), configuration of a physical random access channel occasion (RO) of a second message (MsgA), and configuration of a physical uplink shared channel (PUSCH) of the MsgA.

2. The method according to supplement 1, wherein, an SSB-based RO of the second type of of CFRA is shared with a first type of of contention-based random access (CBRA) and a second type of of CBRA; wherein the second type of of CFRA, the first type of of CBRA and the second type of of CBRA in the shared RO use different preambles.

3. The method according to supplement 2, wherein, configuration of the shared RO includes:

a total number of random access preambles (TotalNumberOfRA-Preambles) available in the RO, the number (N) of SSBs associated with the RO, the number (R) of preambles of the first type of of CBRA occupied by each SSB, the number (R') of preambles of the second type of of CBRA occupied by each SSB, and the number (R") of preambles of the second type of of CFRA occupied by each SSB or a total number of preambles (msgA-TotalNumberOf_Preambles) in the RO used for the second type of of CFRA and the second type of of CBRA.

4. The method according to supplement 3, wherein, if the number (N) of SSBs associated with the RO is less than or equal to 1, the number (R") of preambles of the second type of of CFRA occupied by each SSB is equal to the total number of preambles (msgA-TotalNumberOf_Preambles) in the RO used for the second type of of CFRA and the second type of of CBRA subtracted by the number (R') of preambles of the second type of of CBRA occupied by each SSB;

and if the number (N) of SSBs associated with the RO is greater than 1, the number (R") of preambles of the second type of of CFRA occupied by each SSB is equal to a quotient obtained by the total number of preambles (msgA-TotalNumberOf_Preambles) in the RO used for the second type of of CFRA and the second type of of CBRA divided by N subtracted by the number (R') of preambles of the second type of of CBRA occupied by each SSB.

5. The method according to note 4, wherein, in the RO, R" consecutive preambles of the second type of of CFRA are located after R' consecutive preambles of the second type of of CBRA.

6. The method according to supplement 3, wherein, the SSB-based RO of the second type of of CFRA is also shared with the first type of of CFRA; wherein the second type of of CFRA and the first type of of CFRA in the shared RO use different preambles.

7. The method according to supplement 1, wherein, the synchronization signal block (SSB)-based RO of the second type of of CFRA is shared with the second type of of CBRA; wherein the second type of of CFRA and the second type of of CBRA in the shared RO use different preambles.

8. The method according to supplement 7, wherein, configuration of the shared RO includes:

a total number of random access preambles (msgA-TotalNumberOfRA-Preambles) of the second type of of CFRA and the second type of of CBRA available in the RO, the number (N) of SSBs associated with the RO, and the number (R') of preambles of the second type of of CBRA occupied by each SSB.

9. The method according to supplement 8, wherein, if the number (N) of SSBs associated with the RO is less than or equal to 1, the number (R") of preambles of the second type of of CFRA occupied by each SSB is equal to the total number of preambles (msgA-TotalNumberOfRA-Preambles) available in the RO subtracted by the number (R') of preambles of the second type of of CBRA occupied by each SSB;

and if the number (N) of SSBs associated with the RO is greater than 1, the number (R") of preambles of the second type of of CFRA occupied by each SSB is equal to a quotient obtained by the total number of preambles (msgA-TotalNumberOfRA-Preambles) in the RO used for the second type of of CFRA and the second type of of CBRA divided by N subtracted by the number (R') of preambles of the second type of of CBRA occupied by each SSB.

10. The method according to supplement 9, wherein, in the RO, R" consecutive preambles of the second type of of CFRA are located after R' consecutive preambles of the second type of of CBRA.

11. The method according to supplement 8, wherein, the SSB-based RO of the second type of of CFRA is also shared with the first type of of CFRA; wherein the second type of of CFRA and the first type of of CFRA in the shared RO use different preambles.

12. The method according to supplement 11, wherein, the configuration of the shared RO includes:

a total number of random access preambles (TotalNumberOfRA-Preambles) available in the RO.

13. The method according to supplement 1, wherein, the SSB-based RO of the second type of of CFRA is also shared with the first type of of CBRA; wherein the second type of of CFRA and the first type of of CBRA in the shared RO use different preambles.

14. The method according to supplement 13, wherein, configuration of the shared RO includes:

a total number of random access preambles (TotalNumberOfRA-Preambles) available in the RO, the number (N) of SSBs associated with the RO, the number (R") of preambles of the second type of of CFRA occupied by each SSB, and the number (R) of preambles of the first type of of CBRA occupied by each SSB.

15. The method according to supplement 14, wherein in the RO, R" consecutive preambles of the second type of of CFRA are located after R consecutive preambles of the second type of of CBRA.

16. The method according to supplement 14, wherein, the SSB-based random access occasion (RO) of the second type of of CFRA is also shared with the first type of of CFRA; wherein the second type of of CFRA and the first type of of CFRA in the shared RO use different preambles.

17. The method according to any one of supplements 2-16, wherein, the configuration information of the RO of the second type of of CFRA is carried in system information.

18. The method according to supplement 1, wherein, the SSB-based RO of the second type of of CFRA is independent of the RO of the first type of of CBRA and the RO of the second type of of CBRA.

19. The method according to supplement 18, wherein, configuration of the RO of the second type of of CFRA includes:
a total number of random access preambles (TotalNumberOfRA-Preambles) available in the RO and the number (N) of SSBs associated with the RO.

20. The method according to supplement 19, wherein, the SSB-based RO of the second type of of CFRA is shared with the first type of of CFRA.

21. The method according to supplement 20, wherein, the configuration of the RO further includes:
the number of preambles (R") of the second type of of CFRA occupied by each SSB on the RO.

22. The method according to any one of supplements 18-21, wherein, the configuration information of the RO of the second type of of CFRA is carried in dedicated radio resource control (RRC) signaling.

23. The method according to supplement 1, wherein, the configuration of the PUSCH of the second type of of CFRA includes: a modulation and coding scheme (MCS) of the PUSCH of the second message MsgA, the number of physical uplink shared channel occasions (PO) in a slot, a time domain interval between POs, the number of slots including POs, a time offset between a PO and an RO, a time domain starting position of a PO, the number of POs multiplexed in the frequency domain on the same time, demodulation reference signal (DMRS) configuration of a PO, a frequency domain interval between POs, and a frequency domain starting physical resource block (PRB) of a PO;
wherein a period of the PO is identical to a period of the RO.

24. The method according to supplement 23, wherein, the PUSCH of the second type of of CFRA shares configuration with the PUSCH of the second type of of CBRA.

25. The method according to supplement 24, wherein, K preambles of the second information (msgA) are mapped onto an available PO; where, K is an integer greater than or equal to 1.

26. The method according to supplement 25, wherein, preambles of the second information (msgA) in the RO available in a slot are ranked in a first order and mapped onto the PO in a second order; wherein the preambles of the second information (MsgA) include preambles of the second type of of CFRA and preambles of the second type of of CBRA.

27. The method according to supplement 26, wherein, K=ceil (Npreamble/Npusch); where, Npreamble is a total number of preambles of the second type of of CFRA and preambles of the second type of of CBRA in all available ROs in an SSB and RO mapping cycle, and Npusch is a product of a total number of the POs in the SSB and RO mapping cycle and the number of DMRS indices in a PO.

28. The method according to supplement 24, wherein a preamble group A and a preamble group B of the second type of of CBRA are respectively associated with a PUSCH configuration, and a PUSCH of the second type of of CFRA shares a configuration with a PUSCH associated with the preamble group A or the preamble group B.

29. The method according to supplement 24, wherein the preambles of the second type of of CFRA are associated with two PUSCH configurations, and the preamble group A and preamble group B of the second type of of CBRA are associated with a PUSCH configuration, respectively; the two PUSCHs associated with the preambles of the second type of of CFRA share a configuration with the PUSCH associated with the preamble group A and the PUSCH associated with the preamble group B, respectively.

30. The method according to supplement 23, wherein, the configuration of the PUSCH of the second type of of CFRA is independent of the configuration of the PUSCH of the second type of of CBRA.

31. The method according to supplement 30, wherein, K preambles of the second type of of CFRA are mapped onto an available PO, K being an integer greater than or equal to 1.

32. The method according to supplement 31, wherein, the preambles of the second CFRA in the RO available in a slot are ranked in a first order and mapped onto the PO in a second order.

33. The method according to supplement 32, wherein, K=ceil (Npreamble/Npusch); where, Npreamble is a total number of preambles of the second type of of CFRA in all available ROs in an SSB and RO mapping cycle, and Npusch is a product of a total number of the POs in the SSB and RO mapping cycle and the number of DMRS indices in a PO.

34. The method according to supplement 30, wherein, the preamble group A and preamble group B of the second type of of CBRA are respectively associated with a PUSCH configuration, and a size of a transport block (TB) based on the PUSCH configuration of the second type of of CFRA is in consistence with a size of a TB based on the PUSCH configuration associated with the preamble group A or the preamble group B.

35. The method according to supplement 30, wherein the preambles of the second type of of CFRA are associated with two PUSCH configurations, the preamble group A and preamble group B of the second type of of CBRA are associated with a PUSCH configuration, respectively, and a size of a TB based on the two PUSCH configurations associated with the second type of of CFRA is respectively in consistence with a size of a TB based on the PUSCH configuration associated with the preamble group A and a size of a TB based on the PUSCH configuration associated with the preamble group B.

36. The method according to any one of supplements 1-35, wherein,
in a case where the configuration information of the RO of the second type of of CFRA is carried in dedicated RRC signaling, the terminal equipment uses the configuration information of the RO of the second type of of CFRA carried in the dedicated RRC signaling; otherwise,
the terminal equipment uses the RO configuration information of the second type of of CFRA carried by the system information.

37. The method according to any one of supplements 1-35, wherein, in a case where the configuration information of the PUSCH of the second type of of CFRA is carried in dedicated RRC signaling, the terminal equipment uses the configuration information of the PUSCH of the second type of of CFRA carried in the dedicated RRC signaling; otherwise, the terminal equipment uses the PUSCH configuration information of the second type of of CFRA carried by the system information.

38. The method according to supplement 1, wherein the configuration of the PUSCH of the second type of of CFRA includes: a frequency domain resource position, a periodic time domain resource position and an MCS, of the PUSCH of the second message MsgA.

39. The method according to any one of supplements 1-38, wherein, the preambles of the second type of of CFRA are divided into two or more preamble groups, and the RO configuration includes the number of preambles occupied by at least one of the preamble groups; wherein each preamble group is respectively associated with a PUSCH configuration.

40. A method for configuring random access resources, applicable to a network device, the method including:

transmitting resource configuration of contention-free random access, the resource configuration of contention-free random access including resource configuration of a second type of of contention-free random access (CFRA); and receiving a second message (MsgA) on a resource of second type of of contention-free random;

wherein the resource configuration of the second type of of CFRA includes a second type of of CFRA preamble index related to a synchronization signal block (SSB) or channel state information reference signal (CSI-RS), configuration of a physical random access channel occasion (RO) of the second message (MsgA), and configuration of a physical uplink shared channel (PUSCH) of the MsgA.

41. The method according to supplement 40, wherein, an SSB-based RO of the second type of of CFRA is shared with a first type of of contention-based random access (CBRA) and a second type of of CBRA; wherein the second type of of CFRA, the first type of of CBRA and the second type of of CBRA in the shared RO use different preambles.

42. The method according to supplement 41, wherein, configuration of the shared RO includes:

a total number of random access preambles (TotalNumberOfRA-Preambles) available in the RO, the number (N) of SSBs associated with the RO, the number (R) of preambles of the first type of of CBRA occupied by each SSB, the number (R') of preambles of the second type of of CBRA occupied by each SSB, and the number (R") of preambles of the second type of of CFRA occupied by each SSB or a total number of preambles (msgA-TotalNumberOf_Preambles) in the RO used for the second type of of CFRA and the second type of of CBRA.

43. The method according to supplement 42, wherein, if the number (N) of SSBs associated with the RO is less than or equal to 1, the number (R") of preambles of the second type of of CFRA occupied by each SSB is equal to the total number of preambles (msgA-TotalNumberOf_Preambles) in the RO used for the second type of of CFRA and the second type of of CBRA subtracted by the number (R') of preambles of the second type of of CBRA occupied by each SSB;

and if the number (N) of SSBs associated with the RO is greater than 1, the number (R") of preambles of the second type of of CFRA occupied by each SSB is equal to a quotient obtained by the total number of preambles (msgA-TotalNumberOf_Preambles) in the RO used for the second type of of CFRA and the second type of of CBRA divided by N subtracted by the number (R') of preambles of the second type of of CBRA occupied by each SSB.

44. The method according to note 43, wherein, in the RO, R" consecutive preambles of the second type of of CFRA are located after R' consecutive preambles of the second type of of CBRA.

45. The method according to supplement 42, wherein, the SSB-based RO of the second type of of CFRA is also shared with the first type of of CFRA; wherein the second type of of CFRA and the first type of of CFRA in the shared RO use different preambles.

46. The method according to supplement 40, wherein, the synchronization signal block (SSB)-based RO of the second type of of CFRA is shared with the second type of of CBRA; wherein the second type of of CFRA and the second type of of CBRA in the shared RO use different preambles.

47. The method according to supplement 7, wherein, configuration of the shared RO includes:

a total number of random access preambles (msgA-TotalNumberOfRA-Preambles) of the second type of of CFRA and the second type of of CBRA available in the RO, the number (N) of SSBs associated with the RO, and the number (R') of preambles of the second type of of CBRA occupied by each SSB.

48. The method according to supplement 47, wherein, if the number (N) of SSBs associated with the RO is less than or equal to 1, the number (R") of preambles of the second type of of CFRA occupied by each SSB is equal to the total number of preambles (msgA-TotalNumberOfRA-Preambles) available in the RO subtracted by the number (R') of preambles of the second type of of CBRA occupied by each SSB;

and if the number (N) of SSBs associated with the RO is greater than 1, the number (R") of preambles of the second type of of CFRA occupied by each SSB is equal to a quotient obtained by the total number of preambles (msgA-TotalNumberOfRA-Preambles) of the second type of of CFRA and the second type of of CBRA available in the RO divided by N subtracted by the number (R') of preambles of the second type of of CBRA occupied by each SSB.

49. The method according to supplement 48, wherein, in the RO, R" consecutive preambles of the second type of of CFRA are located after R' consecutive preambles of the second type of of CBRA.

50. The method according to supplement 47, wherein, the SSB-based RO of the second type of of CFRA is also shared with the first type of of CFRA; wherein the second type of of CFRA and the first type of of CFRA in the shared RO use different preambles.

51. The method according to supplement 50, wherein, the configuration of the shared RO further includes:

a total number of random access preambles (TotalNumberOfRA-Preambles) available in the RO.

52. The method according to supplement 40, wherein, the SSB-based RO of the second type of of CFRA is also shared with the first type of of CBRA; wherein the second type of of CFRA and the first type of of CBRA in the shared RO use different preambles.

53. The method according to supplement 52, wherein, configuration of the shared RO includes:

a total number of random access preambles (TotalNumberOfRA-Preambles) available in the RO, the number (N) of SSBs associated with the RO, the number (R") of preambles of the second type of of CFRA occupied by each SSB, and the number (R) of preambles of the first type of of CBRA occupied by each SSB.

54. The method according to supplement 53, wherein,
in the RO, the R" consecutive preambles of the second type of of CFRA are located after the R consecutive preambles of the second type of of CBRA.

55. The method according to supplement 53, wherein,
the SSB-based random access occasion (RO) of the second type of of CFRA is also shared with the first type of of CFRA; wherein the second type of of CFRA and the first type of of CFRA in the shared RO use different preambles.

56. The method according to any one of supplements 41-55, wherein,
the configuration information of the RO of the second type of of CFRA is carried in system information.

57. The method according to supplement 40, wherein,
the SSB-based RO of the second type of of CFRA is independent of the RO of the first type of of CBRA and the RO of the second type of of CBRA.

58. The method according to supplement 57, wherein,
configuration of the RO of the second type of of CFRA includes:
a total number of random access preambles (TotalNumberOfRA-Preambles) available in the RO and the number (N) of SSBs associated with the RO.

59. The method according to supplement 55, wherein,
the SSB-based RO of the second type of of CFRA is shared with the first type of CFRA.

60. The method according to supplement 59, wherein,
the configuration of the RO further includes:
the number of preambles (R") of the second type of of CFRA occupied by each SSB on the RO.

61. The method according to any one of supplements 57-60, wherein,
the configuration information of the RO of the second type of of CFRA is carried in dedicated radio resource control (RRC) signaling.

62. The method according to supplement 40, wherein,
the configuration of the PUSCH of the second type of of CFRA includes: a modulation and coding scheme (MCS) of the PUSCH of the second message MsgA, the number of physical uplink shared channel occasions (PO) in a slot, a time domain interval between POs, the number of slots including POs, a time offset between a PO and an RO, a time domain starting position of a PO, the number of POs multiplexed in the frequency domain on the same time, demodulation reference signal (DMRS) configuration of a PO, a frequency domain interval between POs, and a frequency domain starting physical resource block (PRB) of a PO;
wherein a period of the PO is identical to a period of the RO.

63. The method according to supplement 62, wherein,
the PUSCH of the second type of of CFRA shares configuration with the PUSCH of the second type of of CBRA.

64. The method according to supplement 63, wherein,
K preambles of the second information (msgA) are mapped onto an available PO; where, K is an integer greater than or equal to 1.

65. The method according to supplement 4, wherein,
preambles of the second information (msgA) in the RO available in a slot are ranked in a first order and mapped onto the PO in a second order; wherein the preambles of the second information (MsgA) include preambles of the second type of of CFRA and preambles of the second type of of CBRA.

66. The method according to supplement 65, wherein,
K=ceil (Npreamble/Npusch); where, Npreamble is a total number of preambles of the second type of of CFRA and preambles of the second type of of CBRA in all available ROs in an SSB and RO mapping cycle, and Npusch is a product of a total number of the POs in the SSB and RO mapping cycle and the number of DMRS indices in a PO.

67. The method according to supplement 63, wherein a preamble group A and a preamble group B of the second type of of CBRA are respectively associated with a PUSCH configuration, and a PUSCH of the second type of of CFRA shares a configuration with a PUSCH associated with the preamble group A or the preamble group B.

68. The method according to supplement 63, wherein the preambles of the second type of of CFRA are associated with two PUSCH configurations, and the preamble group A and preamble group B of the second type of of CBRA are associated with a PUSCH configuration, respectively; the two PUSCHs associated with the preamble of the second type of of CFRA share a configuration with the PUSCH associated with the preamble group A and the PUSCH associated with the preamble group B, respectively.

69. The method according to supplement 62, wherein,
the configuration of the PUSCH of the second type of of CFRA is independent of the configuration of the PUSCH of the second type of of CBRA.

70. The method according to supplement 69, wherein,
K preambles of the second type of of CFRA are mapped onto an available PO, K being an integer greater than or equal to 1.

71. The method according to supplement 70, wherein,
the preambles of the second CFRAs in the RO available in a slot are ranked in a first order and mapped onto the PO in a second order.

72. The method according to supplement 71, wherein,
K=ceil (Npreamble/Npusch); where, Npreamble is a total number of preambles of the second type of of CFRA in all available ROs in an SSB and RO mapping cycle, and Npusch is a product of a total number of the POs in the SSB and RO mapping cycle and the number of DMRS indices in a PO.

73. The method according to supplement 69, wherein,
the preamble group A and preamble group B of the second type of of CBRA are respectively associated with a PUSCH configuration, and a size of a transport block (TB) based on the PUSCH configuration of the second type of of CFRA is in consistence with a size of a TB based on the PUSCH configuration associated with the preamble group A or the preamble group B.

74. The method according to supplement 69, wherein the preambles of the second type of of CFRA are associated with two PUSCH configurations, the preamble group A and preamble group B of the second type of of CBRA are associated with a PUSCH configuration, respectively, and a size of a TB based on the two PUSCH configurations associated with the second type of of CFRA is respectively in consistence with a size of a TB based on the PUSCH configuration associated with the preamble group A and a size of a TB based on the PUSCH configuration associated with the preamble group B.

75. The method according to supplement 40, wherein the configuration of the PUSCH of the second type of of CFRA includes: a frequency domain resource position, a periodic time domain resource position and an MCS, of the PUSCH of the second message MsgA.

76. The method according to any one of supplements 40-75, wherein,
the preambles of the second type of of CFRA are divided into two or more preamble groups, and the RO configuration includes the number of preambles occupied by at least one of the preamble groups; wherein each preamble group is respectively associated with a PUSCH configuration.

What is claimed is:

1. An apparatus for configuring random access, applicable to a terminal equipment, the apparatus comprising a first processing unit, the first processing unit being configured to:
   receive configuration of contention-free random access, the configuration of contention-free random access comprising configuration of 2-step contention-free random access (CFRA); and
   perform a 2-step contention-free random access procedure according to the configuration of the 2-step CFRA using a dedicated preamble and physical uplink shared channel (PUSCH),
   wherein the configuration of 2-step CFRA comprises configuration of the dedicated preamble index associated with a synchronization signal block (SSB) or channel state information reference signal (CSI-RS), configuration of at least one physical random access channel occasion (RO) of 2-step CFRA, and configuration of the PUSCH.

2. The apparatus according to claim 1, wherein,
The RO of 2-step CFRA is associated with a SSB and shared with 4-step contention-based random access (CBRA) and 2-step CBRA.

3. The apparatus according to claim 1, wherein,
the RO of 2-step CFRA is associated with a SSB and shared with 2-step CBRA.

4. The apparatus according to claim 2, wherein,
the configuration for the RO of 2-step CFRA is cell-specific configuration for an UL bandwidth part (BWP).

5. The apparatus according to claim 2, wherein,
configuration of the RO comprises:
a total number of random access preambles (TotalNumberOfRA-Preambles) available in the RO, the number (N) of SSBs associated with the RO, the number (R) of preambles of 4-step CBRA occupied by each SSB, the number (R') of preambles of the 2-step CBRA occupied by each SSB.

6. The apparatus according to claim 5, wherein,
in the RO, the preambles of 2-step CFRA are located after R' consecutive preambles of 2-step CBRA.

7. The apparatus according to claim 2, wherein,
the RO of 2-step CFRA is further shared with 4-step CFRA.

8. The apparatus according to claim 3, wherein,
configuration of the RO comprises:
a total number of random access preambles (msgA-TotalNumberOfRA-Preambles) for 2-step CFRA and 2-step CBRA available in the RO, the number (N) of SSBs associated with the RO, and the number (R') of preambles of 2-step CBRA occupied by each SSB.

9. The apparatus according to claim 8, wherein,
in the RO, the preambles of 2-step CFRA are located after R' consecutive preambles of 2-step CBRA.

10. The apparatus according to claim 1, wherein,
the PUSCH includes at least one PUSCH occasion (PO) of 2-step CFRA.

11. The apparatus according to claim 10, wherein,
The dedicated preamble of 2-step CFRA is mapped onto an available PO of the PUSCH; where, the mapped PO is indicated to the terminal equipment in the configuration of 2-step CFRA.

12. The apparatus according to claim 1, wherein,
in a case where the RO of 2-step CFRA is dedicated to the terminal equipment and the configuration of the RO is carried in an dedicated RRC signaling, the terminal equipment uses the dedicated RO for the 2-step CFRA procedure; otherwise,
the terminal equipment uses the RO shared with 4-step CBRA and 2-step CBRA or the terminal equipment uses the RO shared with 2-step CBRA for the 2-step CFRA procedure.

13. An apparatus for configuring random access resources, applicable to a network equipment, the apparatus comprising a second processing unit, the second processing unit being configured to:
   transmit configuration of contention-free random access, the configuration of contention-free random access comprising configuration of 2-step contention-free random access (CFRA); and
   receive a dedicated preamble and physical uplink shared channel (PUSCH);
   wherein the configuration of 2-step CFRA comprises configuration of the dedicated preamble index associated with a synchronization signal block (SSB) or channel state information reference signal (CSI-RS), configuration of at least one physical random access channel occasion (RO) of 2-step CFRA, and configuration of the PUSCH.

14. A communication system, comprising:
a terminal equipment, configured to comprise an apparatus for configuring random access resources, the apparatus comprising a first processor circuit, the first processor circuit being configured to:
   receive configuration of contention-free random access, the configuration of contention-free random access comprising configuration of 2-step contention-free random access (CFRA); and
   perform a 2-step contention-free random access procedure according to the configuration of the 2-step CFRA using a dedicated preamble and physical uplink shared channel (PUSCH),
   wherein the configuration of 2-step CFRA comprises configuration of the dedicated preamble index associated with a synchronization signal block (SSB) or channel state information reference signal (CSI-RS), configuration of at least one physical random access channel occasion (RO) of 2-step CFRA, and configuration of the PUSCH; and
a network equipment, configured to comprise a network equipment apparatus for configuring random access resources, the network equipment apparatus comprising a second processor circuit, the second processor circuit configured to:
   transmit configuration of contention-free random access, the configuration of contention-free random access comprising configuration of 2-step contention-free random access (CFRA); and
   receive a dedicated preamble and physical uplink shared channel (PUSCH);
   wherein the configuration of 2-step CFRA comprises configuration of the dedicated preamble index associated with a synchronization signal block (SSB) or channel state information reference signal (CSI-RS), configuration of at least one physical random access channel occasion (RO) of 2-step CFRA, and configuration of the PUSCH.

* * * * *